Dec. 11, 1962   J. H. CASTEL ET AL   3,068,400
METHOD AND APPARATUS FOR DETERMINING THE DIP
OF STRATA PENETRATED BY A BOREHOLE
Filed Oct. 1, 1958                                    10 Sheets-Sheet 1
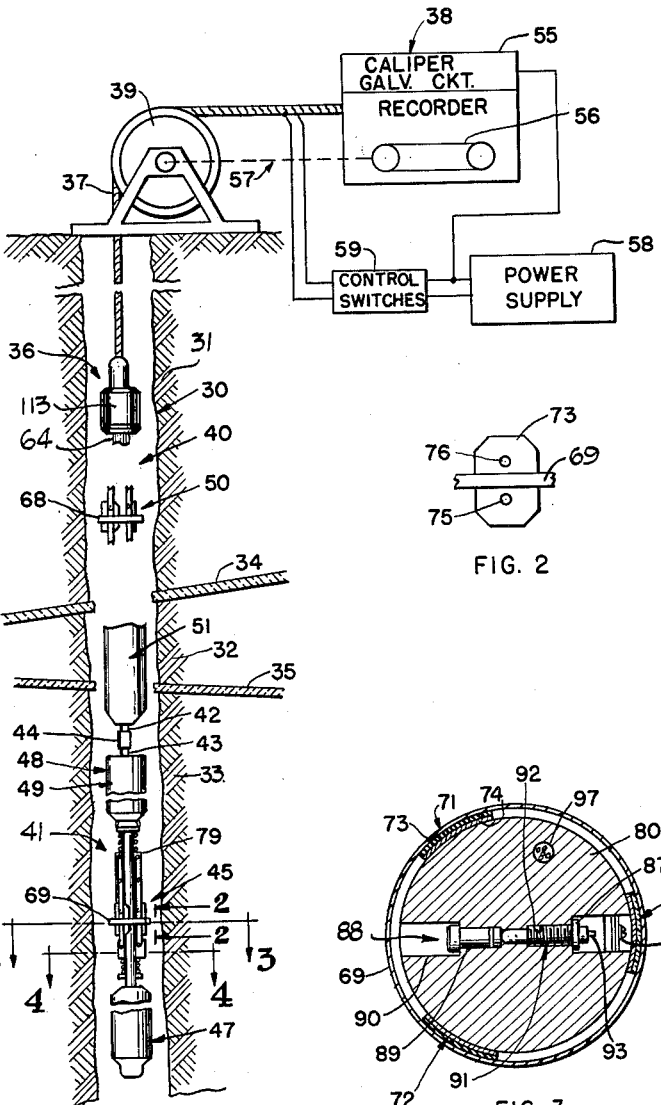
FIG. 1
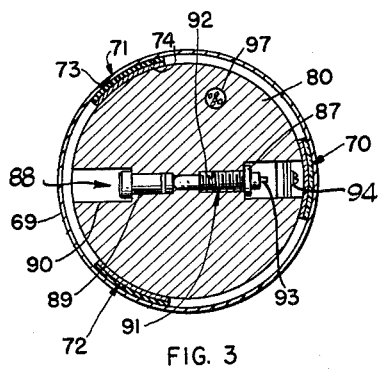
FIG. 2
FIG. 3
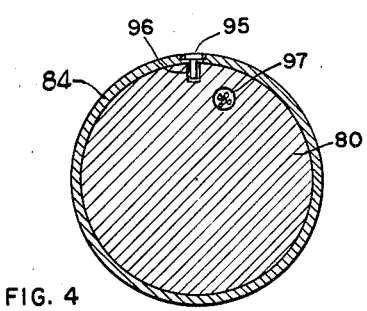
FIG. 4
INVENTORS
JACQUES H. CASTEL
AND LYMAN M. EDWARDS
BY
Mason, Kolehmainen, Rathburn and Wyss.
ATTORNEYS Dec. 11, 1962   J. H. CASTEL ET AL   3,068,400
METHOD AND APPARATUS FOR DETERMINING THE DIP
OF STRATA PENETRATED BY A BOREHOLE
Filed Oct. 1, 1958                                    10 Sheets-Sheet 2

INVENTORS
JACQUES H. CASTEL
AND LYMAN M. EDWARDS
BY
Mason, Kolehmainen, Rathburn and Wyss
ATTORNEYS Dec. 11, 1962 J. H. CASTEL ET AL 3,068,400
METHOD AND APPARATUS FOR DETERMINING THE DIP
OF STRATA PENETRATED BY A BOREHOLE
Filed Oct. 1, 1958 10 Sheets-Sheet 3

INVENTORS
JACQUES H. CASTEL
AND LYMAN M. EDWARDS
BY Mason, Kolehmainen,
Rathburn and Wyss
ATTORNEYS Dec. 11, 1962  J. H. CASTEL ET AL  3,068,400
METHOD AND APPARATUS FOR DETERMINING THE DIP
OF STRATA PENETRATED BY A BOREHOLE
Filed Oct. 1, 1958  10 Sheets-Sheet 4

INVENTORS
JACQUES H. CASTEL
AND LYMAN M. EDWARDS
BY
Mason, Kolehmainen, Rathburn and Wyss.
ATTORNEYS INVENTORS
JACQUES H. CASTEL
AND LYMAN M. EDWARDS
BY Mason, Kolehmainen,
Rathburn and Wyss.
ATTORNEYS Dec. 11, 1962 J. H. CASTEL ET AL 3,068,400
METHOD AND APPARATUS FOR DETERMINING THE DIP
OF STRATA PENETRATED BY A BOREHOLE
Filed Oct. 1, 1958 10 Sheets-Sheet 8

INVENTORS
JACQUES H. CASTEL
AND LYMAN M. EDWARDS
BY
Mason, Kolehmainen, Rathburn and Wyss
ATTORNEYS Dec. 11, 1962   J. H. CASTEL ET AL   3,068,400
METHOD AND APPARATUS FOR DETERMINING THE DIP
OF STRATA PENETRATED BY A BOREHOLE
Filed Oct. 1, 1958   10 Sheets-Sheet 9

INVENTORS
JACQUES H. CASTEL
AND LYMAN M. EDWARDS
BY
Mason, Kolehmainen, Rathburn and Wyss
ATTORNEYS

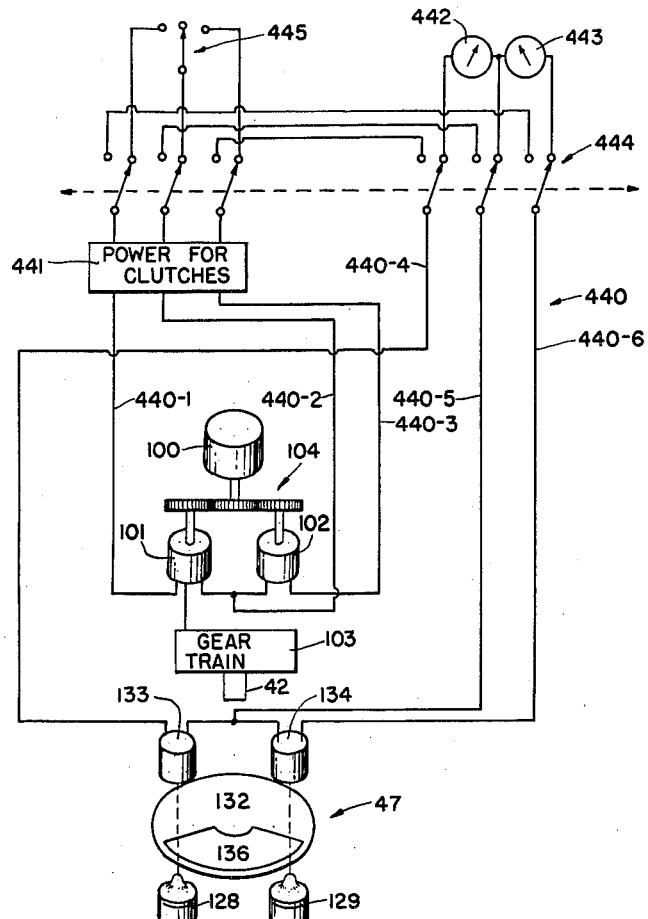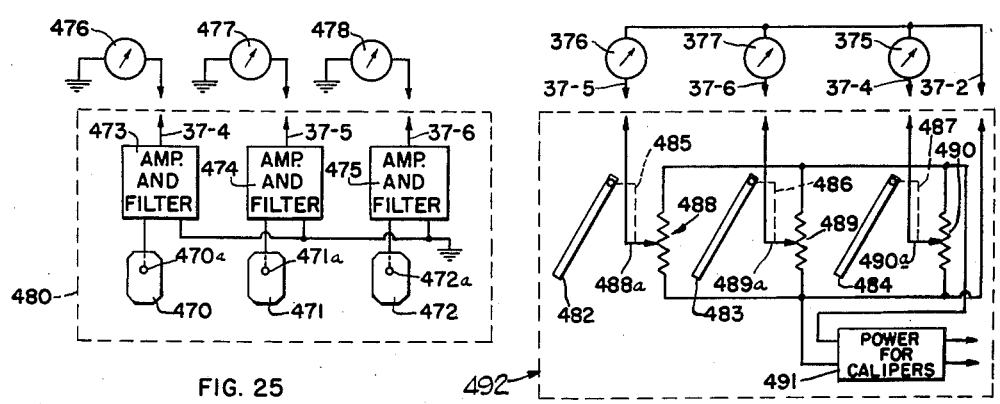

3,068,400
METHOD AND APPARATUS FOR DETERMINING THE DIP OF STRATA PENETRATED BY A BOREHOLE
Jacques H. Castel and Lyman M. Edwards, Houston, Tex., assignors, by mesne assignments, to PGAC Development Company, Houston, Tex., a corporation of Texas
Filed Oct. 1, 1958, Ser. No. 764,629
51 Claims. (Cl. 324—1)

The present invention relates generally to a new and improved method and apparatus for logging a borehole, such as an oil well drilled in the earth, and is more particularly concerned with a method and apparatus for determining the dip and strike of various earth strata penetrated by the borehole.

The prior art has long recognized the value of information concerning the dip and strike of the interfaces formed by the different strata in subsurface earth formations, since information of this nature is extremely valuable in producing a profile of the geologic structures lying below the surface and is useful in predicting the existence and probable extent of oil deposits contained within these structures. Various methods have been proposed heretofore for obtaining information concerning the dip and the strike of the subsurface interfaces. In the earliest stages of the development of the art, for example, it was necessary to log at least three spaced apart wells not located along a straight line in order to obtain sufficient information to determine the dip and strike of the subterranean strata. In systems of this type it was assumed that the interfaces extended in a common plane throughout the area covered by the three wells, and that measurements made in the different wells were, therefore, indicative of the existence of planar strata. Of course, the existence of faults within the area made the measurements inaccurate and, hence, presented a false picture of the subsurface construction.

As the art developed and as logging techniques improved, a number of arrangements were suggested for obtaining all of the information necessary to compute the dip and strike of the strata by making measurements of the formation characteristics in a single well. Different characteristics may be measured and recorded as a function of borehole depth, but all of the suggested arrangements rely upon the use of at least three nonaligned, spaced apart sensing elements mounted in a single plane which preferably, but not necessarily, extends perpendicular to the axis of the borehole. Here again, it is assumed that the lateral extent of the formations is such that the particular strata being examined will appear all around the relatively small area of the borehole even though such strata may be inclined with respect to the borehole axis. By making this assumption it will be apparent that the characteristic of the formations measured by the sensing elements will be the same except that corresponding points on the three records are displaced by an amount which is a function of the dip and strike of the strata. In order to compute accurately the dip and strike of the strata, it is also necessary to record certain auxiliary information, such as the relative positions of the sensing elements and their azimuth, the diameter or radius of the borehole and its direction and angle of inclination at each of the measuring depths and to correlate this information with that derived from the sensing elements.

Originally, in the operation of the single borehole systems, the information was recorded for only short spans located immediately above and below the particular interface or borehole depth under investigation and, frequently, several trips or runs through the borehole were required to obtain all of the necessary information. More recently, however, systems have been developed which provide a continuous and simultaneous log of all of this information during a single run through an extended length of the borehole.

As indicated above, the characteristics measured by the sensing elements may take a number of different forms. For example, one method presently in use, as disclosed in United States Patent No. 2,640,275 of Frank G. Boucher, relies upon caliper measurements to determine the diameter of the borehole at three spaced apart nonaligned points located on a plane extending perpendicular to the borehole axis. Since the different strata are eroded to different extents by the action of the drilling fluid when the borehole is drilled, the borehole diameter measurements exhibit a clear definition between two different types of strata bounding or forming a single interface. Measurement of the diametric variations at three different points, together with the aforementioned auxiliary information concerning direction and angle of inclination of the borehole, provides information from which the dip and strike of the interface can be determined. In a second prior art method, three spaced apart electrodes are employed to measure the natural earth or spontaneous potentials which exhibit sharp changes in passing from one subsurface stratum to another. By measuring the changes at three spaced apart points and correlating it with the auxiliary information discussed above, it is possible to reconstruct the interface by determining its strike and dip. In a third prior art arrangement, electrical resistivity measurements are made at the three spaced apart points by means of closely spaced current and measuring electrodes which are pressed into engagement with the walls of the borehole and by passing current either of predetermined or constant magnitude from the current electrodes through the borehole formations to the measuring electrodes in order to determine the resistivities of the formations at the different points encountered as the electrodes are moved along the walls of the borehole. Here again, the resistivities of the formations will change sharply as the electrodes pass in succession from one stratum to the next and by determining the exact points at which these changes occur on the three spaced apart electrodes information is available to measure the dip and strike of the interface bounded by the two strata.

In all of the prior art arrangements, the measuring apparatus is adapted to be attached to the lower end of a cable so that it may be lowered into the borehole to depths reaching several thousand feet whereupon it may be moved along the formations to be studied. When the measuring apparatus is lowered to such great depths, it has a tendency to turn or rotate about its longitudinal axis during its movement through the borehole. The described rotation or turning introduces two very serious disadvantages. First, if the angle of dip of the formation being logged is appreciable, an error in the dip angle information is introduced if the measuring electrodes or caliper arms are allowed to rotate while passing the interface or the bedding plane being logged. The magnitude of the described error is, of course, a function of the recording speed, the speed of the tool rotation and the angle between the formation plane and the borehole. Secondly, if the downhole tool is allowed to rotate during the logging, every increment of the log obtained is recorded with the sensing elements in a constantly changing direction or azimuth. In prior arrangements, an attempt has been made to overcome the latter disadvantage by recording an additional signal to indicate the azimuth of the sensing elements and this information has been used to correct the dip angle measurements produced by the sensing elements. This not only requires additional conductors and recording equipment but, at the same time, severely complicates the analysis of the recorded curves and the computations derived therefrom. More specifically, the process of correlating the azimuth information with the other auxiliary information and with the displacements derived from the sensing elements on a point by point basis is both laborious and time consuming due to the complexity of the mathematical computations necessary to assimilate all of the recorded information into the intricate formulae and lengthy calculations necessary to obtain the final result.

In addition, the recording of the azimuth information, as suggested by the prior art, does not avoid the aforementioned inaccuracies resulting from the turning of the measuring apparatus during a log of formations having a relatively large angle of dip. Moreover, in the prior art arrangements, if the borehole should extend directly through non-planar deviations such as faults in the strata, the results obtained will be extremely confusing and may lead to an improper analysis of the make-up of the geologic structures involved.

One of the primary purposes of the present invention is to eliminate the disadvantages described above by providing a tool which has its measuring or sensing elements permanently oriented in the borehole so that they do not change direction during the logging operation.

It is a further object of the invention to provide an instrument of improved accuracy for measuring the dip and strike of the subsurface strata traversed by the borehole.

It is also an object of the present invention to provide a method and apparatus for measuring the dip and strike of various subsurface strata which is not only more accurate than the prior art arrangements, but which also greatly simplifies the calculations necessary to compute the dip of the formations.

Another object of the invention is to provide an improved dipmeter permitting the measurement and interpretation of very small dips which cannot be logged by equipment presently in use.

A still further object of the present invention is to provide an improved well logging apparatus which produces different sets of curves corresponding to different orientations of the sensing elements during separate trips of the measuring apparatus past the formations under investigation, thereby eliminating a number of errors inherent in prior art systems and, at the same time, providing a check on the results obtained.

Still another object of the invention is to provide an apparatus according to the preceding object wherein the orientation of the sensing elements can be changed without removing the downhole tool from the borehole, thus avoiding the loss of time required to bring the tool to the surface and to lower it again to the depth of the formations under investigation.

A further object of the invention is to provide an apparatus of the character indicated above employing a cable containing a minimum number of conductors extending from the downhole tool to the earth's surface.

It is another object of the invention to provide an improved arrangement for measuring the direction and inclination of the borehole.

It is likewise an object of the present invention to provide a new and improved apparatus for recording a pair of signals indicative of the direction and angle of inclination of the borehole together with a calibration signal for the inclinometer signals while utilizing only a single cable conductor for transmitting all of these signals from the downhole tool to the surface equipment.

In accordance with the present invention, the foregoing and other objects are realized by simultaneously measuring a characteristic of the subsurface formations at three or more nonaligned, spaced apart points located along a plane extending transversely of the borehole and preferably extending perpendicular to its axis. Three separate curves are made continuously and simultaneously by recording the characteristics from the three spaced apart points and, at the same time, a continuous record is made of the borehole diameter and one continuous record is made from which the direction and angle of inclination of the borehole may be determined. All of the curves are produced in side-by-side relationship on a single record so that transversely aligned points on the record represent corresponding times or borehole depths and, as a result, these curves contain sufficient information to permit a determination of the dip and strike of the various interfaces traversed as the measuring points are moved along the borehole. The formation characteristic measured may be any of those produced by the prior art arrangements referred to above and could include, for example, spontaneous or natural earth potentials, acoustical properties, magnetic permeability or retentivity, diametric variations resulting from erosion and electrical resistivity or impedance. However, since the most prevalent characteristic measured and the most useful for most applications is the electrical resistivity or impedance, the ensuing description will be concerned, for the most part, with the use of the method and apparatus of the present invention to make measurements of this type. In making the curves, the sensing elements are maintained in permanent or fixed orientation within the borehole, thus eliminating the necessity for recording a curve representing the azimuth of these elements and, at the same time, avoiding the complicated mathematical calculations required to integrate the azimuth information with the other information recorded. In accordance with an important feature of the present invention, provision is also made for changing the effective orientation of the measuring points so that a second log can be made of the same formations in order to provide a check on the measurements made during the first run and to increase the accuracy of the final result. All of the described measurements are made at the earth's surface in response to signals transmitted from the downhole tool over a cable employing a minimum number of wire lines or conductors.

The invention, both as to its organization and manner of operation, together with further objects and advantages thereof will best be understood by reference to the following detailed description taken in conjunction with the accompanying drawings wherein:

FIG. 1 is a diagrammatic view illustrating a borehole being logged by apparatus characterized by the features of the present invention;

FIG. 2 is an enlarged fragmentary view looking in the direction of the arrows 2—2 in FIG. 1 and illustrating one of the electrode carrying pads employed in the apparatus illustrated in FIG. 1;

FIG. 3 is an enlarged sectional view taken along a line substantially corresponding to the line 3—3 in FIG. 1 and illustrating particularly the mechanism for releasing the electrode carrying arms employed in the apparatus illustrated in FIG. 1;

FIG. 4 is an enlarged sectional view taken along a line substantially corresponding to the line 4—4 in FIG. 1;

Figure 22:
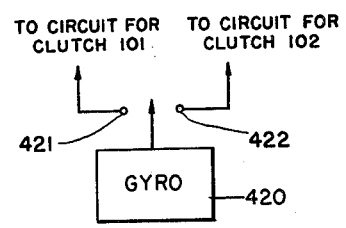
Figure 23:
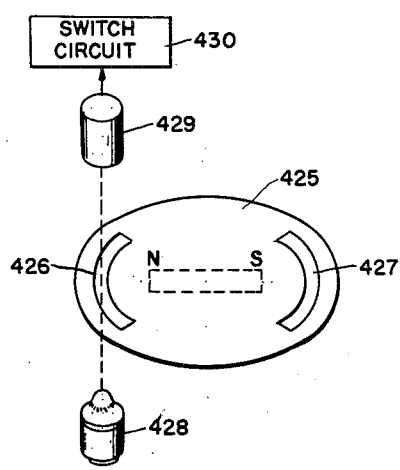
Figure 21:
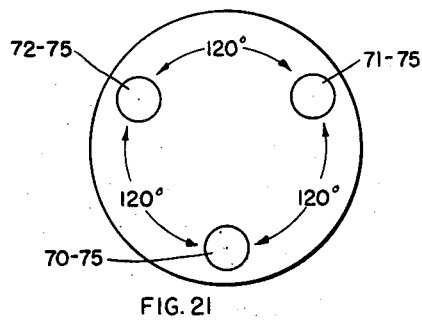

FIG. 21 diagrammatically illustrates one possible rearrangement of the positions of the measuring or sensing elements for different runs or trips of the downhole tool through the borehole;

FIG. 22 illustrates another form of azimuth sensing mechanism employing a gyro;

FIG. 23 diagrammatically illustrates a warning arrangement for informing the operator of a malfunction in the downhole tool;

FIG. 24 is a partially schematic partially diagrammatic view illustrating an alternative arrangement of the apparatus illustrated in FIG. 1 but showing a circuit wherein the effective orientation of the downhole measuring or sensing elements can be changed by means of switches operated at the surface;

FIG. 25 is a diagrammatic view illustrating the apparatus of the present invention as used in conjunction with a log wherein the sensing or measuring elements are employed to supply information concerning spontaneous or natural earth potentials; and FIG. 26 is a view similar to FIG. 23 but illustrates the use of the present invention in conjunction with a system wherein the sensing elements are used to provide caliper curves indicating changes in the borehole radius or diameter.

Referring now to the drawings and more particularly to FIG. 1 thereof, the present invention is there illustrated for use in logging a borehole 30 which extends downwardly from the earth's surface through subterranean formations indicated by appropriate cross-hatching. These formations include a plurality of strata 31, 32 and 33 bounding interfaces 34 and 35. The interfaces 34 and 35 are in the form of bedding planes which pass through the borehole 30 and, in view of the fact that the borehole is very small in diameter as compared to the lateral extent of the interfaces 34 and 35, it will be presumed that all of the points of intersection between each of the interface planes and the borehole lie in the same plane. As is conventional in this art, the borehole 30 may be filled at least partially with a fluid such as drilling mud generally employed in drilling operations, although this fluid is not shown in the drawings.

For the purpose of logging the borehole 30 to provide information concerning the dip and strike of the interfaces 34 and 35 as well as any other interfaces intersecting the borehole 30 but not shown in FIG. 1, a downhole tool indicated generally by the reference character 36 is adapted to be lowered into the borehole upon the lower end of a multiconductor cable 37 extending through the borehole 30 from the downhole tool to surface equipment indicated generally by the reference numeral 38. To facilitate the raising and lowering of the downhole equipment 36, the cable 37 may be trained over a motor driven sheave 39 or the like which may be rotated in either direction in order to effect the raising or lowering of the downhole tool.

Briefly considered, the downhole tool 36 includes an upper tool section 40 and a lower tool section 41 interconnected by shafts 42 and 43 and by a detachable coupling 44. The coupling 44 is of the type which may be readily disconnected to permit repair or replacement of one or both of the tool sections 40 and 41 or to permit disassembly of the downhole tool during storage or transport. The lower tool section includes a plurality of spaced apart measuring or sensing elements 45 to be described more fully hereinafter, a caliper system 46 (FIG. 6), azimuth sensing mechanism 47, inclinometer measuring apparatus 48 to determine the direction and angle of inclination of the borehole and a housing 49 containing the electronic circuits such as signal amplifiers, filters and the like.

The upper tool section includes a plurality of centralizer arms indicated generally at 50 which function to center the downhole equipment 36 within the borehole 30 in order to facilitate the dip and strike measurements as described more fully below. The upper tool section 40 further includes a chamber 51 containing drive mechanism 52 (FIG. 5) for rotating the shafts 42 and 43 and the coupling 44 in the manner described below in order to maintain the lower tool section 41 in permanently oriented position while the borehole is being logged.

The surface equipment 38 includes recording apparatus 55 which receives signals via the cable 37 from the downhole tool 36 and produces a plurality of curves upon a recording medium 56. The recording apparatus 55 may be of any type conventionally employed in this art and may, for example, include a plurality of recording galvanometers for directing light beams upon a light sensitive recording medium and for controlling the movements of these light beams so that visible curves appear in side-by-side fashion on the medium. The recording medium 56 is preferably driven by mechanism indicated schematically by broken line 57 so that it moves in synchronism with the sheave 39 in order to correlate the curves appearing on the recording medium with the depth of the downhole tool 36 in the borehole 30. The surfac eequipment 38 further includes a power supply 58 and control switches 59 for controlling the operation of the downhole tool 36 as will be described more fully hereinafter. The recording apparatus 55 receives one signal from the caliper system 46 to produce a curve on the medium 56 which is representative of the diameter of the borehole 30 at all of the points traversed by the downhole tool 36. The recorder 55 also receives three signals from the measuring or sensing elements 45 and utilizes these three signals to produce three curves respectfully representative of the characteristics of the earth formations measured by these sensing elements. The recording apparatus 55 also receives two inclinometer signals and an inclinometer calibrating signal from the inclinometer device 48 but these signals are combined to produce a single curve on the recording medium 56 representative of the direction and angle of inclination of the borehole 30.

Figure 5:
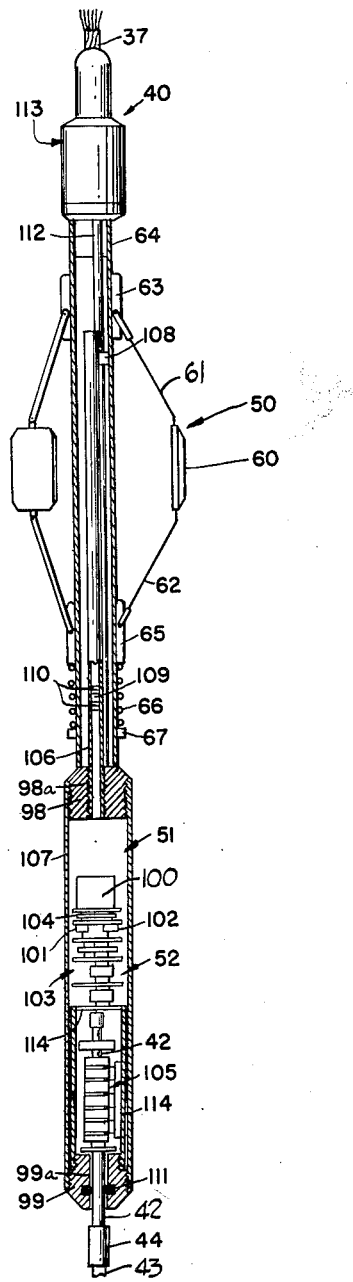
FIG. 5 is a fragmentary sectional view showing the upper section of the downhole tool employed in the apparatus illustrated in FIG. 1 with the spring loaded arms being shown in extended position.

Generally, in logging a borehole the downhole tool 36 is lowered to a predetermined depth with the centralizer arms 50 and the sensing elements 45 held in their retracted positions illustrated in FIG. 1. More specifically, each centralizer arm comprises a wall engaging pad 60 supported upon spring loaded arms 61 and 62 as is best shown in FIG. 5 of the drawings. One end of each of the arms 61 is attached for pivotal movement upon a sleeve or collar 63 encircling an outer tube 64 forming a part of the upper tool section 40. In similar manner, one end of each of the support arms 62 is pivotally attached to a sleeve or collar 65 which also encircles the tube 64. A compression spring 66 having one end in engagement with the lower edge of the sleeve 65 and having its other end in engagement with a fixed collar 67 secured to the tube 64 urges the pads 60 radially outward from the axis of the downhole tool 36 and into engagement with the walls of the borehole during the logging operation, thereby insuring that the axis of the downhole tool 36 coincides substantially with the axis of the borehole. However, when the downhole tool is being lowered through the borehole 30, it is desirable to maintain the pads 60 out of engagement with the borehole walls and, to this end, a thin, metallic band 68 holds the pads in retracted position illustrated in FIG. 1 with their undersides in engagement with the outer surface of the tube 64. The band 68 is adapted to be severed when the downhole equipment 36 reaches a predetermined depth in the borehole by means of any of the mechanisms well known in this art and this band may, for example, be broken by igniting a small explosive charge which passes a plug outwardly through the band in response to a signal received from the surface equipment 38. A typical mechanism for severing the band is illustrated in FIG. 3 and is described below in conjunction with the release of the sensing or measuring elements 45. While a single set of centralizer arms is shown in the drawings, it may be preferable in some installations, especially in logging boreholes having severe inclination, to provide an additional set of centralizer arms for the lower tool section located either above or below the sensing elements.

Figure 6:
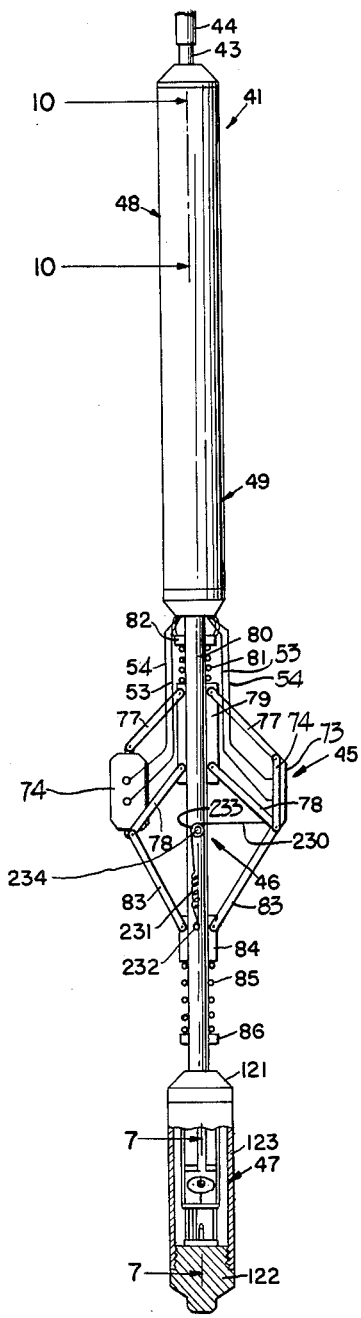
FIG. 6 is a view similar to FIG. 5 but showing the lower section of the downhole tool.

Turning now to the sensing elements 45 and referring particularly to FIGS. 1, 2, 3 and 6, it should be observed that three such elements are provided and these are individually identified by reference numerals 70, 71 and 72. As indicated previously, the sensing elements may be used to gather any type of information heretofore employed in the prior art to determine the direction and angle of the dip and strike of the subsurface interfaces. In the form of the invention illustrated in FIGS. 1 to 13, however, the sensing elements are used in an arrangement for determining the eelctrical resistivity of the formations adjacent the borehole 30 and, to this end, each of the sensing elements includes an insulating pad 73 formed of rubber or the like and mounted upon a rigid backing plate 74. The pads are equally spaced and are located at positions displaced 120° about the axis of the downhole tool 36. As is best illustrated in FIG. 2, each insulating pad 73 is provided with a pair of vertically spaced apart openings respectively accommodating a current electrode 75 and a measuring electrode 76. These electrodes are pressed into engagement with the walls of the borehole when the pads are urged radially outward from the lower tool section 41. More specifically, as shown in FIG. 6, each of the backing plates 74 is pivotally connected to one end of a pair of link arms 77 and 78 which have their other ends pivotally connected to a sleeve 79 encircling a central mandrel 80 in the lower tool section. The link arms 77 and 78 are of equal length and, hence, cooperate with the backing plate 74 and with the sleeve 79 to form a parallelogram type construction to insure that all of the pads 73 extend substantially parallel to the central axis of the downhole tool 36. A compression spring 81 surrounding the mandrel 80 acts against the sleeve 79 and against a fixed collar 82 secured to the mandrel to urge the sleeve downwardly as viewed in FIG. 6. To complete the mounting of the sensing elements upon the lower tool section, a link arm 83 is pivotally mounted upon the lower end of each of the backing plates 74 and is also pivotally attached to a lower sleeve 84 mounted for sliding movement on the mandrel 80. The lower sleeve 84 is normally urged upwardly by means of a compression spring 85 acting between its lower end and a collar 86 fixedly secured to the mandrel. Since all of the backing plates are connected to common sleeves 79 and 84, the sensing elements are moved outwardly in unison when the springs expand and they are prohibited from moving independently. The described mounting construction for the three sensing elements insures that the downhole tool will remain approximately centered in the borehole 30 and also insures that the electrodes carried by the pads 73 will be pressed against the walls of the borehole despite variations in borehole diameter and, at the same time, will be maintained in a common plane extending perpendicular to the axis of the tool when they are extended by expansion of the springs 81 and 85. When the sensing elements are extended as shown in FIG. 6, the resilient material of the mounting pads provides a seal to prevent the flow of drilling mud or fluid between the outer surfaces of the electrodes and the borehole walls.

When the downhole tool 36 is being lowered within the borehole, the sensing elements are held in their retracted positions with the backing plates 74 being forced inwardly into engagement with the central mandrel 80 and with the sleeves 79 and 84 acting to compress the springs 81 and 85. The sensing elements are held in their retracted position by means of a thin, metallic band 69 encircling all of the pads 73 in order to prevent the compression springs 81 and 85 from expanding. When the downhole tool 36 has reached its predetermined depth in the borehole 30, the band 69 is adapted to be severed by a releasing mechanism indicated generally in FIG. 3 by the reference numeral 88. The mechanism 88 is triggered simultaneously with the mechanism for releasing the centralizer arms 50 as soon as it is desired to center the downhole tool 36 within the borehole in position to begin the log. As is illustrated in FIG. 3, the release mechanism 88 may comprise a plug 89 seated within a bore 90 formed in the mandrel 80. The plug 89 may include an enlarged head seated within an enlarged portion of the bore 90 and a main body portion extending toward the center of the mandrel. Near the center of the mandrel, the plug 89 opens to an igniter mechanism indicated generally by the reference numeral 91. The igniter mechanism 91 includes a chambered plug 87 threaded into a bore 92 formed in the mandrel and containing a supply of explosive powder. A fuse mechanism 93 at the end of the plug 87 is ignited by means of electric current supplied to a contact 94 from the surface equipment in the manner described below. When the circuit to the contact 94 is completed, the fuse mechanism 93 ignites the explosive powder within the plug 87 and propels the plug 89 radially outward from the mandrel to penetrate and sever the bands 69 whereupon the springs 81 and 85 act upon the linkage mounting the pads 73 to force the latter outwardly and into engagement with the walls of the borehole as illustrated in FIG. 6.

Each of the sleeves 63 and 65 of the centralizer assembly 50 and each of the sleeves 79 and 84 of the sensing apparatus 45 is prevented from rotating about the axis of the tool in any suitable manner as, for example, by means of a pin and slot connection of the type illustrated in FIG. 4. Of course, other constructions such as a key and a key receiving guideway could be provided to permit these sleeves to slide while, at the same time, preventing them from turning or rotating. However, as illustrated in FIG. 4, the sleeve 79 carries a pin 95 which has its inner end extending into an elongated guide slot 96 formed in the mandrel 80. The pin 95, of course, rides with in the slot 96 when the sensing elements are moved from their retracted positions to their extended positions so that these elements cannot turn with respect to the axis of the downhole tool 36. The mandrel 80 is also provided with a through passage 97 through which electrical conductors extend from the azimuth sensing mechanism 47 and from the caliper system 46 to the electronics equipment within the housing 49. Conductors 53 and 54 are connected from the electrodes of each of the sensing elements to the electronics equipment and these conductors enter the housing 49 through conventional sealing pins not shown.

In accordance with an important feature of the present invention, the azimuth sensing mechanism 47 functions to determine the azimuth of the sensing elements 70, 71 and 72 and to supply a signal to the upper tool section 40 for the purpose of maintaining the lower tool section 41 along the sensed azimuth while the tool is being drawn upwardly through the hole during the logging operation. The upper tool section 40 rotates as a result of the variable torque developed by the twists in the cable 37 but the shafts 42 and 43 and the coupling 44 are rotated by the drive mechanism 52 to maintain the lower tool section 41 permanently oriented along the predetermined azimuth. To this end, the drive mechanism 52 includes a drive motor 100 mounted within the chamber 51 as is best shown in FIG. 5. The chamber 51 is defined by an upper head member 98, a lower base member 99 and an elongated sleeve 107 secured to these two members in any suitable fashion as by threaded connections. The output of the drive motor 100 is connected through a reduction gearing 104 to a pair of clutches 101 and 102 preferably of the electrically operated or magnetic type which are actuated by the signals from the azimuth sensing mechanism 47. The clutches are connected through reduction gearing 103 to the drive shaft 42 which carries a plurality of slip rings cooperating with brushes to permit electrical connections between the upper and lower tool sections 40 and 41 and, at the same time, to allow full freedom of rotation between these two tool sections. The slip ring and brush assembly is designated by reference numeral 105.

The chamber 51 is filled with a nonconductive lubricating fluid, such as silicon or transformer oil for the purpose of lubricating the components of the drive mechanism 52 and of carrying off any heat developed by the motor 100. The chamber 51 is provided with a compensating apparatus to equalize the pressure between the borehole fluid and the insulating fluid contained in the chamber. This presure compensating apparatus may take the form of a bellows, an expandable sleeve, or other similar mechanism, but in the apparatus illustrated in FIG. 5, a piston and cylinder assembly is provided to effect the pressure equalization. To this end, an elongated tube 106 is threaded into a central bore 98a in the upper head member 98 and extends upwardly within the outer tube 64 referred to above. The outer tube 64 is suitably secured at its lower end to the head member 98 and extends coaxially with the inner tube 106. A second tube 112 extends upwardly from the chamber 51 through the outer tube 64 to provide a conduit for the electrical conductors leading from the drive mechanism 52 and from the lower tool section 41 to a cable connector subassembly 113 located at the upper end of the upper tool section 40. The cable subassembly 113 is, of course, connected to the lower end of the cable 37. Near its top the tube 106 is connected to the fluid in the borehole 30 through one or more ducts 108 extending outwardly through the outer tube 64. A piston 109 is positioned within the tube 106 and is exposed on its upper face to the borehole fluid which enters the tube through the ducts 108 and on its underside is exposed to the fluid in the chamber 51. The piston 109 is provided with suitable spaced apart rings 110 coacting with the walls of the tube 106 to isolate the fluid in the chamber from the borehole fluid so that the fluid in the chamber 51 may expand and contract in response to temperature changes in order to equalize the pressure between the borehole fluid and the insulating fluid in the chamber. Although not shown in the drawings, the piston 109 is provided with a pressure equalizing passage extending from its lower face and opening to the space between the two rings 110. The shaft 42 extends through a central opening 99a in the base member 99 and an O-ring 111 disposed within an annular groove surrounding the bore 99a is seated against the shaft 42 to prevent the entry of borehole fluid into the chamber 51 and, at the same time, to permit low friction rotation of the shaft. The motor 100, the clutches 101 and 102, the gear trains 103 and 104 and associated components are supported upon suitable structure 114 secured in any suitable manner to the base member 99.

Figure 7:
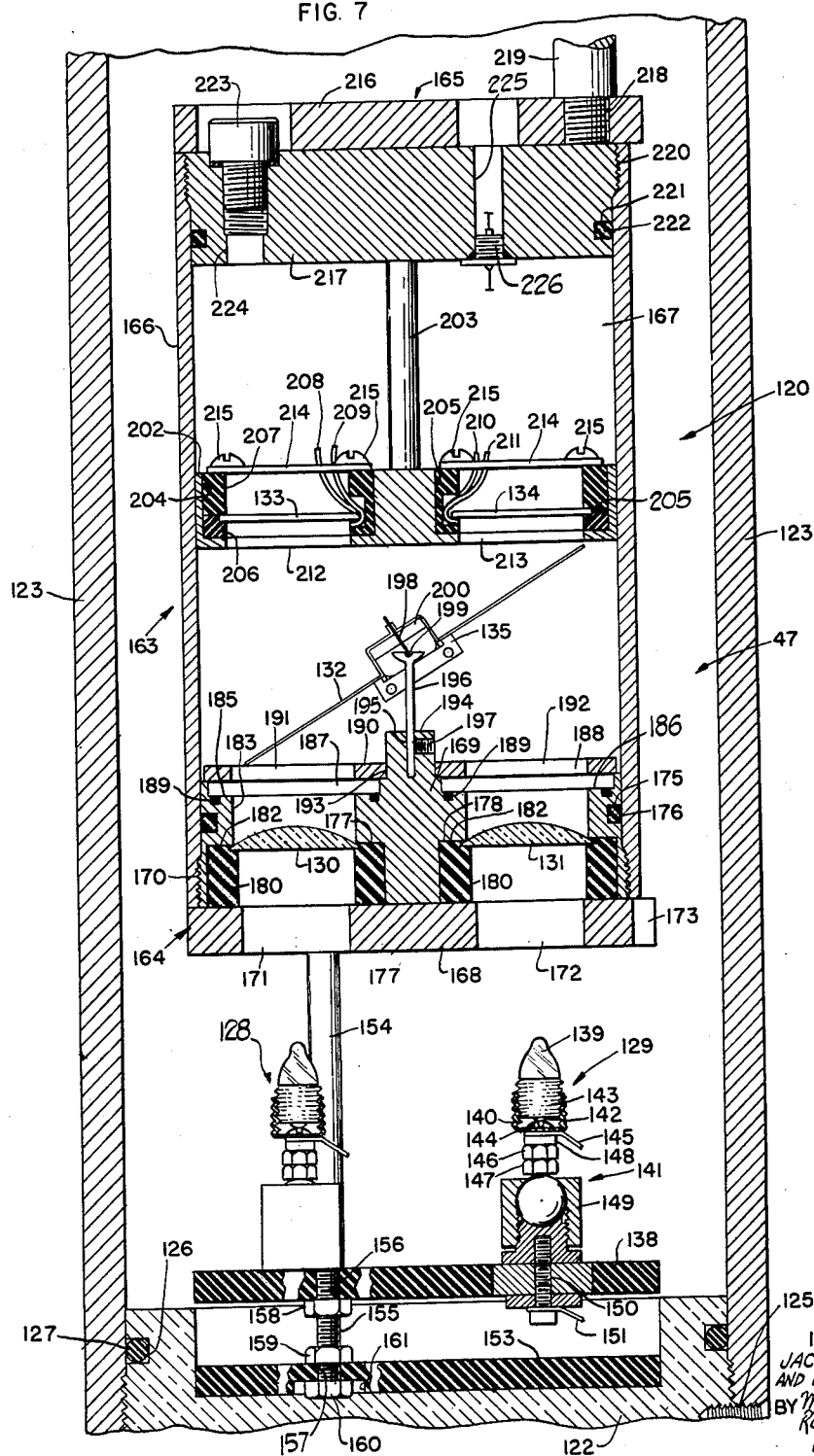
FIG. 7 is an enlarged sectional view taken along a line substantially corresponding to the line 7—7 in FIG. 6 and showing particularly the azimuth sensing mechanism which forms an important feature of the present invention.
Figure 8:
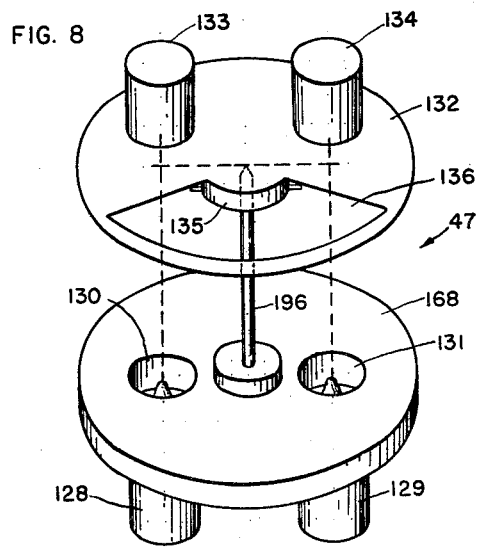
FIG. 8 is a perspective, diagrammatic view illustrating the operation of the azimuth sensing mechanism shown in FIG. 7.

During the logging operation, the motor 100 runs continuously and its output shaft is connected through the reduction gearing 104 to rotate the top elements of each of clutches 101 and 102 in opposite directions. The lower elements of the clutches 101 and 102 are connected through the gearing 103 to drive the shaft 42 with the result that the latter shaft rotates in one direction when the clutch 101 is energized and rotates in the opposite direction when the clutch 102 is engaged. As previously indicated, signals for controlling the energization of the clutches 101 and 102 are derived from the azimuth sensing mechanism 47 which serves to determine the orientation of the lower tool section 41 and in the event that the lower tool section deviates from its predetermined azimuth, to supply a signal to energize one of the clutches 101 or 102 so that the lower tool section is turned in the proper direction to reestablish its orientation along the predetermined azimuth. The mechanism for supplying the azimuth direction signals may take a number of forms as illustrated in FIGS. 7, 8 and 15 to 22, inclusive. The azimuth sensing mechanism 47 illustrated in FIGS. 7 and 8 is housed within a chamber 120 formed at the lower end of the lower tool section 41. This chamber is defined by upper and lower spaced apart plugs or cap members 121 (FIG. 6) and 122 (FIGS. 6 and 7) interconnected by a sleeve 123. As is best shown in FIG. 6, the sleeve 123 may be internally threaded at its opposed ends for the purpose of receiving the cap members 121 and 122. To prevent the sleeve from turning with respect to the cap members, each of the threaded connections may be further provided with a lock screw passing through the sleeve and having its inner end received within a tapped opening in the cap member. Only one such lock screw is illustrated in FIG. 7 and this is designated by the reference numeral 125. For the purpose of sealing the chamber 120 against the entry of borehole fluid, each of the members 121 and 122 is provided with an annular groove containing a sealing ring seated against the outer surface of the sleeve 123. Here again, only one such groove, designated by the reference numeral 126, and one such sealing ring, designated by the reference numeral 127, are illustrated in FIG. 7.

The primary components of the azimuth sensing mechanism 47 disposed within the chamber 120 are a pair of light sources 128 and 129, a pair of lenses 130 and 131 for collecting the light from the sources 128 and 129, respectively, and directing this light through a partially cutout disc 132 to a pair of light sensitive cells 133 and 134. The disc 132 carries a magnet 135 either of the permanent or electrical type for the purpose of maintaining the disc oriented with respect to a line extending north and south. The disc 132 may take a number of forms as described below but, in the form shown in FIG. 8, is provided with a light controlling opening 136. The light sources 128 and 129, the lenses 130 and 131, the opening 136 in the disc 132 and the light sensitive cells 133 and 134 are preoriented with respect to the fixed azimuth along which the lower tool section 41 is to be moved. These elements may be oriented in any position desired to maintain the lower tool section 41 along any fixed azimuth but, to simplify the ensuing description, it will be assumed that it is desired to maintain the downhole tool along an azimuth extending north-south in which case the lights 128 and 129 are aligned with respect to a north-south line and are mounted in fixed position upon a circular base 138. The light sources 128 and 129 are of identical construction and each includes a light bulb 139 and a bulb receiving socket 140 mounted upon a terminal assembly indicated generally by the reference character 141 for establishing electrical connections to the center terminal 142 and to the base 143 of the light bulb. To this end, the socket 140 is attached to the terminal assembly through a screw 144 having its head in engagement with the center terminal 142 and having its body threaded into the terminal assembly 141. Electrical connection to the screw is made through a conductor 145. A pair of lock nuts 146 and 147 and an insulating washer or grommet 148 space the socket 140 above a conventional ball and socket type unit 149 forming a part of the terminal assembly 141. A machine screw 150 having its head in engagement with the terminal of an electrical conductor 151 is threaded into the unit 149 to secure the latter to the base 138 and to complete the electrical connection to the socket 140 from the conductor 151. The bulb 139 is, of course, illuminated by current passing through its filament between the conductors 145 and 151.

The circular base 138 is attached to a disc 153 which is, in turn, secured to the cap member 122 in any suitable manner, as for example, by machine screws not shown. the members 138 and 153 are maintained in spaced apart relationship by three support posts 154 spaced 120° apart about the axis of the tool and having externally threaded reduced diameter portions 155 at their lower ends extending through aligned openings 156 and 157 respectively formed in the members 138 and 153. The base 138 is held in position upon the posts by means of nuts 158 threaded onto the lower ends of the posts in order to seat the base 138 against an annular shoulder formed on each post by the reduced diameter portion. The disc 153 is held in assembly with the posts 154 by means of lock nuts 159 and 160 threaded onto the reduced diameter portion 155. The nuts 160 are accommodated within spaced apart circular recesses 161 formed in the underside of the disc 153 as viewed in FIG. 7. The upper ends of the posts 154 are suitably secured to a light collecting subassembly indicated generally by the reference numeral 163.

The subassembly 163 includes a pair of end pieces 164 and 165 interconnected by a cylindrical sleeve 166 cooperating with the end pieces to form an enclosed chamber 167. In order to damp the oscillations of the light controlling disc 132, the chamber 167 is filled with a suitable transparent damping fluid such as silicone. To facilitate the construction, each of the end pieces 164 and 165 is formed in two pieces which are secured together to form an integral unit threaded into the ends of the sleeve 166. To this end, the end piece 164 comprises a circular plate or disc 168 and a body member 169 suitably secured as by welding or bolting to the disc 168. The body member 169 includes an externally threaded body portion 170 accommodated within the internally threaded lower end of the sleeve 166. The disc 168 is provided with a pair of openings 171 and 172 for admitting light from the sources 128 and 129 to the lenses 130 and 131, respectively. The disc 168 is further provided with one or more slots or notches 173 to facilitate its alignment with the remaining components of the subassembly 163. The body member 169 is provided with an annular groove 175 in its periphery for the purpose of accommodating an O-ring 176 seating against the inner wall of the sleeve 166 in order to seal the lower end of the chamber 167. The body member 169 is further provided with enlarged circular recesses 177 and 178 respectively aligned with the openings 171 and 172. A cushion ring 180 is disposed within each of the enlarged recesses 177 and 178 for the purpose of seating the rim of each of the lenses 130 and 131 against an annular shoulder 182 formed by the enlarged recesses. The cushion rings are provided with a central opening aligned with light passing openings 183 and 184 formed in the body member 169. Annular recesses 185 and 186 formed adjacent the openings 183 and 184 respectively accommodate transparent cover plates 187 and 188 formed of glass or the like. Sealing gaskets or rings 189 disposed within annular grooves adjacent the recesses 185 and 186 serve to provide a fluid seal to prevent the flow of the damping fluid from the chamber 167 to the lenses 130 and 131. The transparent plates 187 and 188 are held in position within the recesses 185 and 186, respectively, by means of a locking disc 190 suitably secured to the body member 169. The disc 190 includes openings 191 and 192 for passing the light from the lenses 130 and 131, respectively, and, in addition, includes a central opening 193 for accommodating a raised hub or boss 194 on the body member 169. The hub is provided with an axial opening 195 for receiving a pivot bearing 196 for the disc 132. The pivot bearing 196 is held in position within the opening 195 by means of a set screw 197 threaded into the boss 194.

The magnet 135 is secured to the underside of the disc 132 near its center and tends to maintain the disc oriented along a predetermined azimuth despite changes in the azimuth of the lower tool section 41 and also tends to maintain the disc in a horizontal plane despite inclination of the borehole 30. Thus, it might be said that the magnet functions to establish a predetermined azimuth of orientation of the lower tool section. To permit the rod 196 to rotate about the center of the disc 132 in the event that the downhole tool tends to change azimuth and, at the same time, to allow the disc to remain horizontal while the tool 36 tilts in the event that the borehole deviates from the vertical position, the disc is mounted upon the pivot bearing 196 by means of a small needle 198 suitably secured to the center of the disc and having its end disposed within a small needle receiving recess 199 formed in the center of the pivot bearing 196. The needle 198 is centered with respect to the disc by means of a mounting assembly indicated at 200. The disc 132 is free to tilt with respect to the pivot bearing 196 through an arc having an angle greater than that likely to be encountered in any inclination of the borehole with respect to the vertical.

The light rays from the sources 128 and 129 pass through the openings 171 and 172, through the center of the cushion ring 180, through the lenses 130 and 131, through the openings 183 and 184, through the transparent plates 187 and 188 and through the openings 191 and 192 to the disc 132. The lens 130 focuses the light from the source 128 and directs it toward the light sensitive cell 133 while the lens 131 focuses the light from the source 129 and directs it toward the cell 134. As long as the tool section 41 is disposed along the predetermined azimuth, the disc 132 prevents the light rays from reaching either of the cells 133 or 134, due to the fact that the opening 136 in this disc spans somewhat less than 180° of the disc. Thus, assuming as indicated above, that the downhole tool is to be maintained along a north-south line, it will be recognized that as long as the magnet 135 maintains the disc 132 in a north-south direction, the light from the two lenses 130 and 131 will be confronted by a solid portion of the disc 132. As soon as the downhole tool 41 tends to deviate from the north-south line or, more generally, from the predetermined azimuth, the light sources and their cells are turned while the disc is held in substantially fixed azimuth by the magnet 135 with the result that light is admitted to one of the cells 133 or 134. The cells 133 and 134 are respectively connected to suitable amplifiers and relays to be referred to hereinafter, which serve to control the energization of the clutches 101 and 102, respectively. Thus, if the downhole tool tends to deviate from the north-south line in a first direction, light is admitted to the cell 133 and the clutch 101 is energized to rotate the downhole tool section in the proper direction to restore it to the predetermined azimuth, while deviation of the downhole tool in the opposite direction admits light to the cell 134 to energize the clutch 102 in order to rotate the downhole tool in the opposite direction to restore the downhole tool to the predetermined azimuth.

The light sensitive cells 133 and 134 are preferably of the silicon P-N junction type which possess a fairly large output over a wide temperature range and which, for this reason, are relatively insensitive to the effects of the high temperatures usually encountered in well bores. Of course, other light responsive cells of the photoemissive, photoconductive barrier or photovoltaic type might be employed but, in many of the cells used in the prior art, it will be necessary to provide some insulation from the high temperatures present in the borehole. This may be accomplished by use of a Dewar flask which is very fragile and costly and, for this reason, the P-N junction type cells are generally preferred. The cells 133 and 134 are held in position by a cell supporting disc or plate 202 suspended from the upper end piece 165 by means of one or more posts 203. The disc 202 is provided with enlarged openings 204 and 205 each accommodating a pair of resilient cushion rings 206 and 207 formed of rubber or the like. The cells 133 and 134 are held by the cushion rings 206 and 207 and the latter rings are provided with a recess to permit passage of the electrical conductors for the cell upwardly and through the chamber 167. The electrical conductors for the cell 133 are designated by reference numerals 208 and 209 while those for the cell 134 are designated 210 and 211. The disc 202 is further provided with openings 212 and 213 in respective alignment with the lenses 130 and 131 for the purpose of admitting light to the cells 133 and 134. The cushion rings 206 and 207 are retained within the recesses 204 and 205 by means of cover plates 214 secured to the disc 202 by means of machine screws 215.

The upper end member 165 like the lower end member 164 is of two-piece construction and includes an upper disc or plate 216 joined to a body member 217. The disc 216 is provided with a plurality of tapped bores 218 for receiving the lower ends of posts 219 connecting the upper end piece to the member 121 shown in FIG. 6. The body member 217 has an externally threaded portion 220 threaded into the upper end of the sleeve 166. An annular groove 221 in the periphery of the body member 217 accommodates an O-ring 222 seating against the inner surface of the sleeve 166 in order to seal the upper end of the chamber 167. A plug 223 threaded into a tapped opening 224 in the body member may be removed for the purpose of filling the chamber 167 with the damping fluid referred to above. The body member 217 is further provided with a plurality of openings 225 each containing a sealing plug 226 through which the electrical conductors from the azimuth sensing mechanism 47 pass upwardly to a suitable connecting plug (not shown) in the end member 121. As previously indicated, these conductors pass upwardly through the passage 97 in the mandrel 80 to the electronics equipment within the housing 49.

As indicated above, the apparatus of the present invention is adapted to provide a continuous recording of the borehole diameter in order to facilitate interpretation of the curves produced by the sensing elements 70, 71 and 72. The caliper measuring equipment may be of any type known in the art and could, for example, take the form of the mechanism shown in pending application Serial No. 493,041 of Jacques H. Castel, and now Patent No. 2,864,173. In the form shown in the drawings, however, one of the sensing elements, for example, the element 70 illustrated in FIGS. 3 and 6 has a flexible wire 230 attached at one end to the backing plate 74 and at its other end is secured to the upper end of a spring 231. The lower end of the spring 231 is fixedly secured to the mandrel 80 as indicated at 232 in FIG. 6. The flexible wire 230 is trained over a pulley 233 which turns or rotates in response to movement of the sensing element 70 as the diameter of the borehole varies. The pulley 233 is mounted upon a shaft 234 connected to drive the wiper 236 of a potentiometer 237 illustrated in FIG. 13. The potentiometer 237 is connected in an electrical circuit to supply signals to the surface equipment representative of the diameter or radius of the borehole and these signals are recorded as described more fully hereinafter simultaneously with the signals from the sensing elements 70, 71 and 72.

Figure 9:
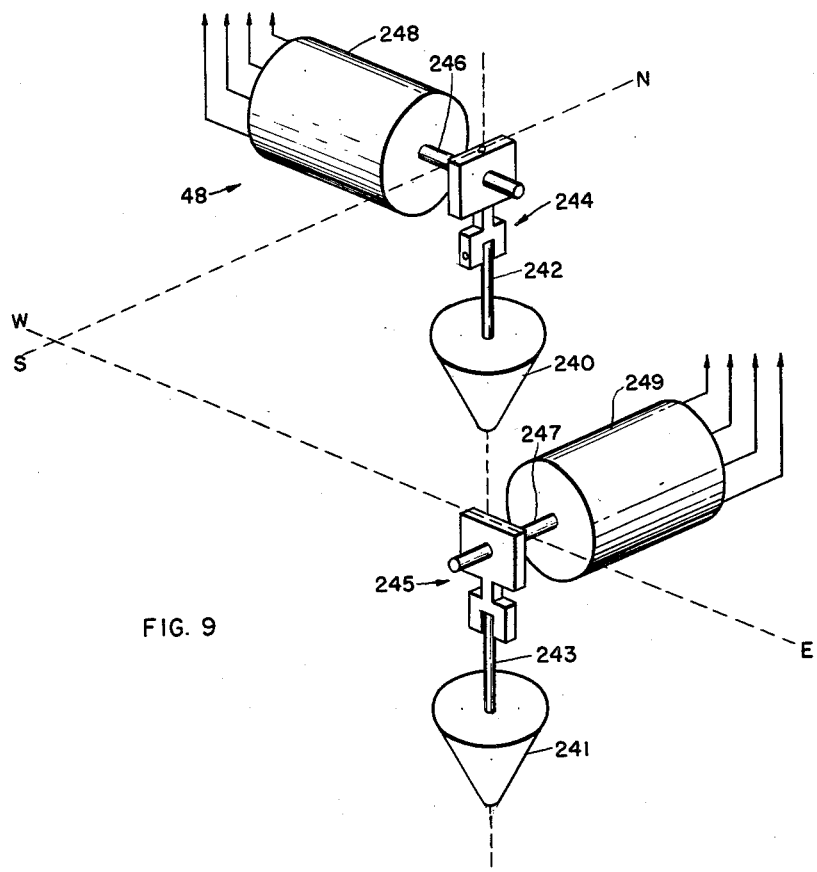
FIG. 9 is a diagrammatic view illustrating the operation of the inclinometer equipment employed in the apparatus shown in FIG. 1.
Figure 10:
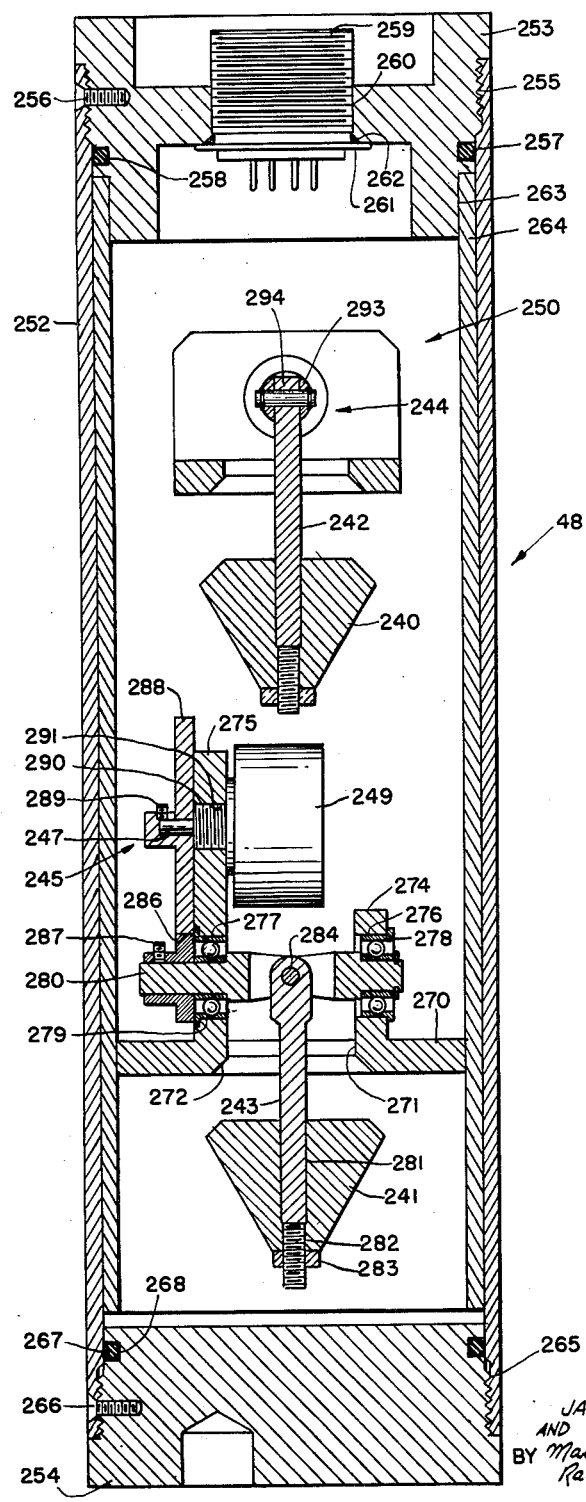
FIG. 10 is an enlarged sectional view taken along a line substantially corresponding to the line 10—10 in FIG. 6 and illustrating particularly the inclinometer mechanism shown diagrammatically in FIG. 9.

The inclinometer apparatus 48 is best shown in FIGS. 9 and 10 of the drawings and includes a pair of pendulum masses 240 and 241 respectively suspended upon the lower ends of pendulum arms 242 and 243 which have their upper ends mounted for rotation upon hinge assemblies 244 and 245. The hinge assemblies, in turn, actuate operating shafts 246 and 247 of a pair of center tapped potentiometers 248 and 249 mounted at right angles to each other. The hinge assemblies 244 and 245 permit movement of the two pendulums at right angles to the direction of rotation of their corresponding potentiometer shafts without causing rotation of these shafts.

The pendulum masses 240 and 241, their support arms and their corresponding hinge assemblies are mounted so that the pendulum mass 240 swings through an arc lying in the north-south plane while the pendulum mass 241 swings through an arc lying in the east-west plane. All of these elements are maintained in fixed position with respect to the remaining components of the lower tool section 41 so that the azimuth sensing mechanism 47 described above and the drive mechanism 52 associated therewith functions to maintain the inclinometer elements in their respective planes. In the event that the borehole is inclined so that the axis of the tool is other than vertical the movements of the two pendulum masses 240 and 241 correspond to the respective components of the north-south and east-west directions of the angle of borehole inclination. The pendulum mass 240 thus rotates the shaft 246 in such manner that the output of the potentiometer 248 is indicative of the direction and magnitude of the north-south components of the angle of inclination and, in similar manner, the pendulum mass 241 turns the shaft 247 so that the potentiometer 249 develops a signal corresponding to the direction and magnitude of the angle of inclination in the east-west direction. The pendulum masses 240 and 241 are substantially conical in shape with their apexes pointing downwardly in order to permit their rotation through relatively large angles within a chamber 250 of minimum size. The chamber 250 illustrated in FIG. 10 is filled with oil or silicon in order to dampen the oscillations of the two pendulum masses 240 and 241. The potentiometers 248 and 249 are of the wire-wound type with the gap or spacing between consecutive turns being constant and, hence, as the wiper or rider of each potentiometer moves between successive turns exactly equal increments of resistance change are incurred, whereby the change in resistance in each potentiometer in response to movement of the pendulum masses 240 and 241 takes place in equal or uniform steps.

Referring now to FIG. 10, it will be observed that the chamber 250 containing the inclinometer mechanism 48 is formed by a cylindrical sleeve 252 joined at its opposed ends to upper and lower end members 253 and 254. Specifically, the end member 253 includes an externally threaded portion 255 accommodated within the upper end of the sleeve 252. One or more machine screws 252 may be employed to prevent the end member 253 from turning with respect to the sleeve 252. An O-ring 257 seated within an annular groove 258 defined in the periphery of the end member 253 functions to seal the upper end of the chamber 250 in order to prevent leakage of the damping fluid and to prohibit entry of the borehole fluid into the chamber. A connector plug 259 extends through a central opening 260 in the end member 253 and functions to provide an electrical connection for the conductors passing to the slip ring assembly 105 in the upper tool section 40. The connector 259 is suitably secured to the end member 253 as, for example, by means of a locking ring 261 and, in order to prevent the flow of fluid in either direction along the walls defining the opening 260, a sealing ring or gasket 262 is preferably disposed adjacent the locking ring. The end member 253 further includes a circular peripheral recess 263 formed on its inwardly extending end for the purpose of acocmmodating a second cylindrical sleeve 264 extending coaxially within the outer sleeve 252.

The lower end member 254 also includes an externally threaded portion 265 threaded into the lower end of the outer sleeve 252. Here again, one or more machine screws 266 may be employed to prevent rotation between the lower end member 254 and the sleeve 252. The lower end of the chamber 250 is sealed by means of an O-ring 267 seated within an annular groove 268 defined in the periphery of the end member 254.

To support the east-west potentiometer 249 and its associated components, there is provided a support block 270 suitably secured to the inner sleeve 264. This block includes a central opening 271 of sufficient size to permit full freedom of movement of the pendulum arm 243 through an arc having an angle somewhat larger than the maximum angle of borehole inclination likely to be encountered. The support block 270 is chamfered or tapered as indicated at 272 adjacent the lower end of the opening 271 to increase the angle of rotation of the arm 243. The block 270 further includes a pair of vertical, parallel support arms 274 and 275 extending upwardly from the base of the block. The arms 274 and 275 are respectively provided with aligned openings 276 and 277 for accommodating ball bearing assemblies 278 and 279 rotatably journalling a stub shaft 280 pivotally supporting the upper end of the pendulum arm 243. The lower end of the arm 243 extends through a central longitudinal opening 281 in the pendulum mass 241 and its extreme end is externally threaded as indicated at 282 for the purpose of receiving a nut 283 which functions to retain the pendulum mass 241 on the pendulum arm. The upper end of the arm 243 is mounted for pivotal movement about a pin 284 secured to the shaft 280 whenever the pendulum mass 241 swings in a north-south plane as a result of the borehole inclination. The swinging of the mass 241 in the north-south plane has no effect on the shaft 280 and, hence, this movement is not transmitted to the operating shaft 247 of the east-west potentiometer 249. The shaft 280 is, of course, rotated upon the bearing assemblies 277 and 278 whenever the pendulum mass 241 swings in the east-west plane, that is in a direction extending into and out of the paper as viewed in FIG. 10. To transmit the turning movement of the shaft 280 to the operating shaft 247, a gear 286 is secured by means of set screw 287 to the end of the shaft 280 and meshes with a somewhat larger gear 288 secured to the potentiometer shaft 247 by means of set screw 289. The potentiometer 249 is secured to the arm 275 by means of an externally threaded hub 290 threaded into a tapped bore 291 formed in this arm. Suitable bearings (not shown) are contained within the hub 290 for the purpose of journalling the operating shaft 247 of the east-west potentiometer.

In view of the foregoing description it will be recognized that both of the masses will at all times tend to remain in their vertical positions due to the action of gravity and that changes in inclination of the borehole will cause the downhole tool section 41 and all of the elements fixedly secured thereto to move about the pendulum masses. Thus, the previously described swinging movement of the masses is actually a movement of the tool 36 with respect to the fixed masses. As the tool inclines in the east-west plane the shaft 280 is turned to rotate the gears 286 and 288 in order to turn the operating shaft 247 of the potentiometer in a direction which is dependent upon the direction of deviation of the downhole tool 36 or the borehole 30 from the vertical and by an amount which is dependent upon the magnitude of such deviation. Since the potentiometer 249 is center tapped its wiper will rest upon the zero or center position whenever the borehole has no inclination in the east-west direction and will be moved to one side or the other of the center tap if the borehole is inclined, the direction of movement of the wiper being a function of the direction of the borehole inclination. If the potentiometer winding terminals are connected to a D.C. source such as source 295 shown in FIG. 11, the polarity of the signal appearing between the wiper and the center tap will be a measure of the direction of inclination either to the east or to the west while the magnitude of this signal represents the amount of deviation in the east-west plane.

The mounting for the pendulum mass 240 and its associated components is identical to that of the pendulum 241 and, hence, need not be described in detail. As previously indicated, the pendulum mass 240 is adapted to turn its operating shaft 293 which is, of course, identical in construction to the shaft 280 described above. Any borehole inclination which causes swinging movement of the lower tool section 41 in the east-west plane causes the support rod 242 to pivot about pin 294, but this movement does not result in turning the shaft 293 and, as a consequence, has no effect on the north-south potentiometer 248. Thus, the direction of turning of potentiometer shaft 246 is a function of the direction of the borehole inclination while the amount of turning of this shaft depends upon the magnitude of the deviation. Here again, the potentiometer 248 is center tapped and its wiper rests upon the zero or center position whenever the borehole has no inclination in the north-south direction. The opposed ends of the winding of potentiometer 248 are connected to the D.C. source 295 so that the polarity of the signal appearing between the center tap and the wiper is dependent upon whether the borehole inclines to the north or to the south while the magnitude of this signal is dependent upon the angle of borehole inclination in the north-south direction.

Figure 11:
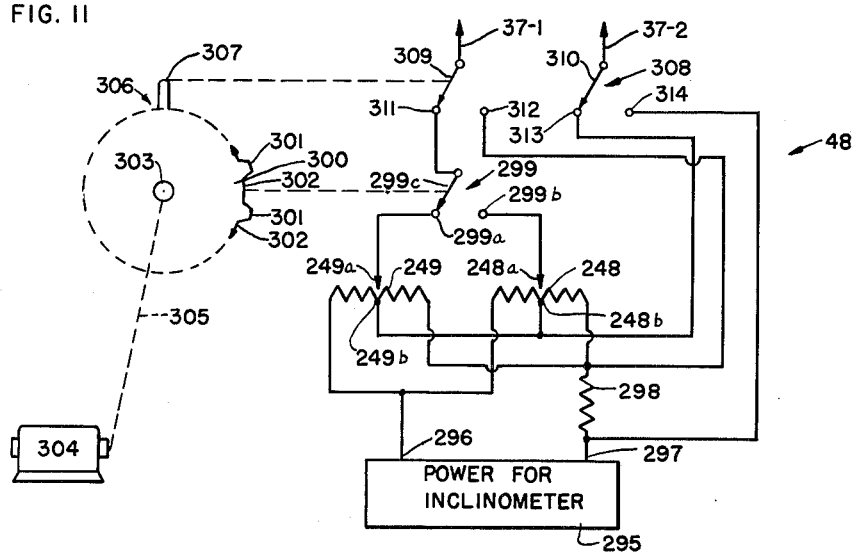
FIG. 11 is a schematic diagram showing the circuits for transmitting both the north-south and east-west inclinometer signals to the surface equipment as well as a signal for calibrating the inclinometer signals.
Figure 12:
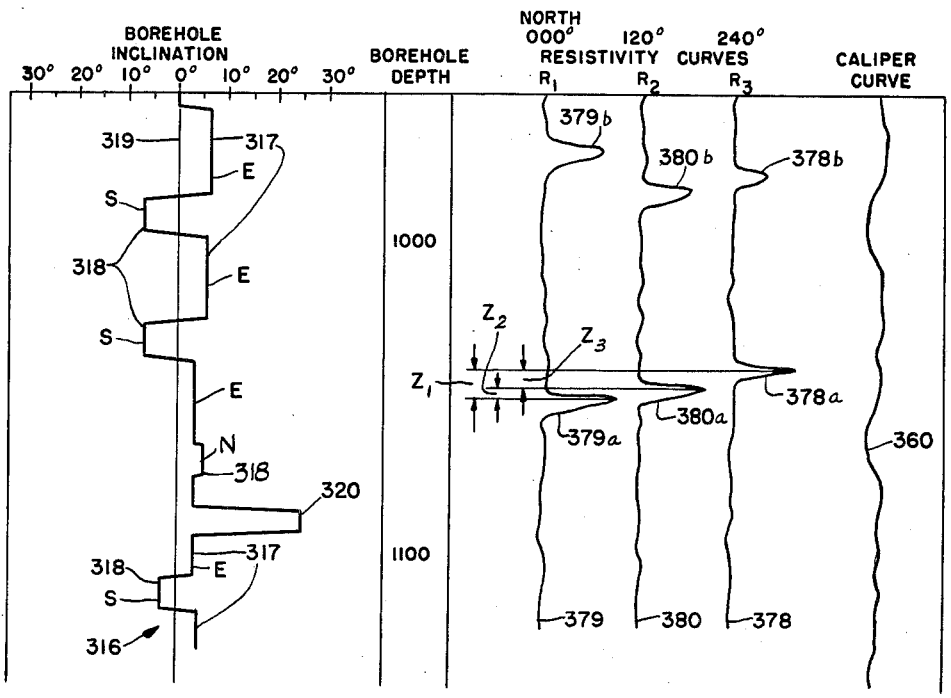
FIG. 12 shows a typical section of the record produced by the apparatus illustrated in FIG. 1 containing all of the curves appearing in side-by-side relationship.
Figure 13:
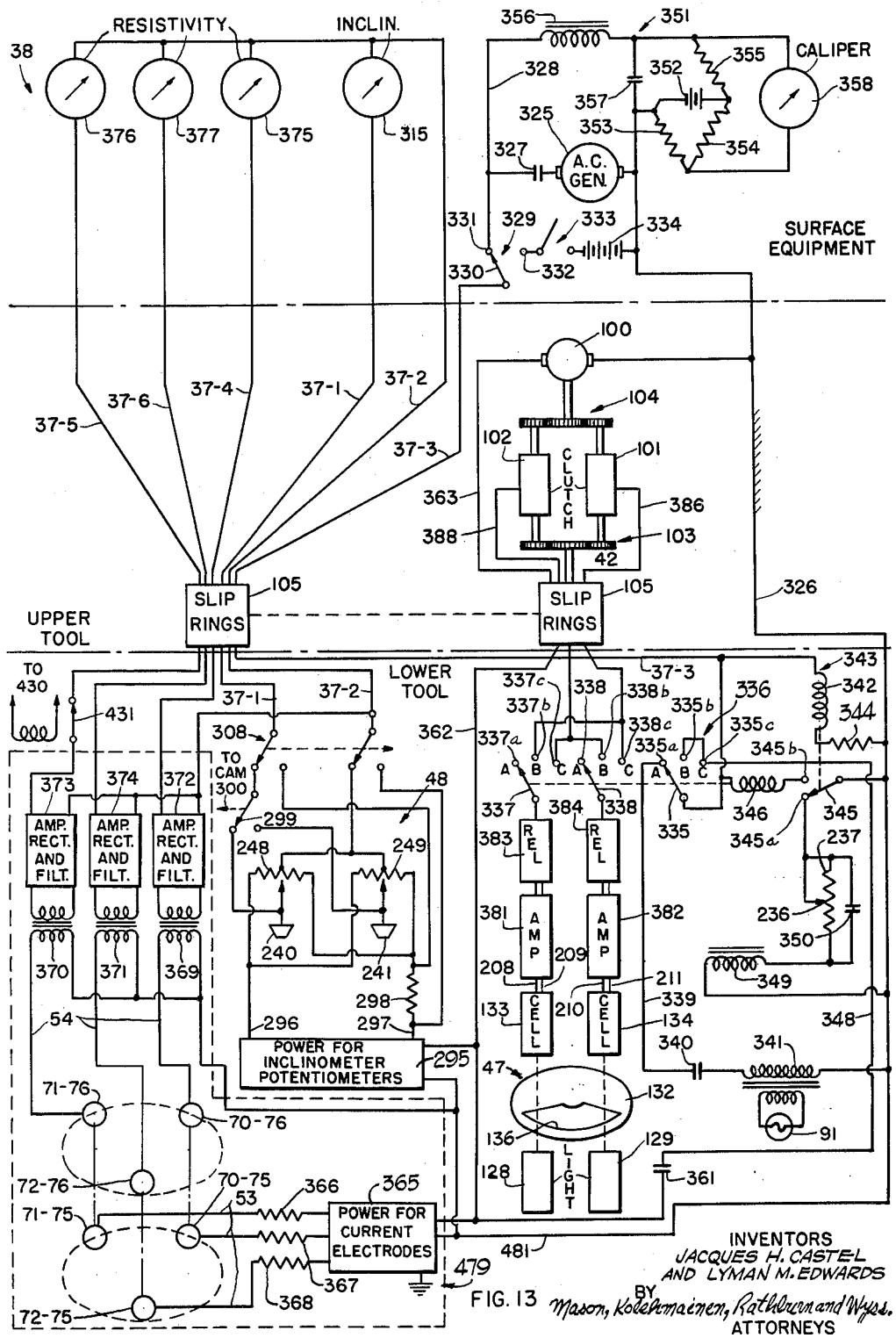
FIG. 13 is a schematic view illustrating the electrical circuits involved in the operation of the apparatus shown in FIG. 1 with certain of the components being shown in diagrammatic form to facilitate the illustration.

In accordance with an important feature of the present invention, the number of conductors in the cable 37 is minimized by transmitting both of the signals developed by the potentiometers 248 and 249 together with an inclinometer calibrating signal over the same pair of cable conductors to the surface equipment. To this end, a circuit of the type illustrated in FIG. 11 is employed. As there shown and as indicated above, the potentiometers 248 and 249 are energized by direct current from a power source 295. The D.C. power supplied by the source 295 may be obtained by rectifying alternating current sent to the downhole tool from the surface equipment and by filtering the rectified output or, alternatively, the D.C. current may be derived from mercury cells. In any event, one terminal 296 of the power supply 295 is connected to one end of the windings of both of the potentiometers 248 and 249 while the other terminal 297 of the power supply is connected through a highly stable calibrating resistor 298 to the other ends of the windings of both potentiometers 248 and 249. The calibrating resistor 298 is connected in series with the windings of both of the potentiometers 248 and 249 between the terminals 296 and 297 with the result that a constant voltage drop appears across this resistor as long as the voltage between the terminals of the power source 295 remains constant. Wiper 249a of the east-west potentiometer 249 is connected to a first fixed contact 299a of a cam operated potentiometer sampling switch 299 while wiper 248a of the north-south potentiometer 248 is connected directly to a second fixed contact 299b of the latter switch. The movable pole 299c of the potentiometer sampling switch 299 is moved into alternate engagement with the fixed contacts 299a and 299b by means of a cam 300 having a plurality of spaced apart cam projections 301 of equal size separated by dwell portions 302 which are also of equal size. The cam 300 is secured to a shaft 303 which is driven from a motor 304 through a drive connection indicated by the broken line 305. The drive connection 305 may include suitable reduction gearing for the purpose of driving the shaft 303 at relatively slow speed. A second cam 306 secured to the shaft 303 includes a single projection 307 for operating a calibrating switch indicated generally by the reference numeral 308. The calibrating switch 308 is of the double pole type and includes poles 309 and 310 respectively connected to conductors 37–1 and 37–2 in the multiconductor cable interconnecting the surface equipment and the downhole tool 36. The movable pole 309 is adapted alternately to engage a first fixed contact 311 connected to the movable pole 299c and a second fixed contact 312 connected to the upper end of the calibrating resistor 298. The movable pole 310 is adapted alternately to engage a first fixed contact 313 connected to the joined center taps 248b and 249b of the potentiometers 248 and 249 and a second fixed contact 314 connected to the lower end of the calibrating resistor 298. The motor 304 is continuously operated so that the cams 300 and 306 function periodically to move the pole 299c of the switch 299 and the poles 309 and 310 of the switch 308 between their different positions. The switch 308 is operated only once during each complete revolution of the shaft 303, that is, during the brief interval when the projection 307 is effective to move the poles 309 and 310 into respective engagement with the fixed contacts 312 and 314 and during the remaining portion of each revolution these poles remain in engagement with the contacts 311 and 313. The switch 299, on the other hand, is operated several times during each complete revolution of the shaft 303, since the pole 299c is moved into engagement with the fixed contact 299b each time that one of the raised projections 301 is effective to move the pole 299c out of engagement with the contact 299a. Assuming that the switch 308 is in the position illustrated in FIG. 11 as will be the case for the major portion of each revolution of the shaft 303, the switch 299 functions alternately to connect the wipers 248a and 249a to the cable conductor 37–1, while, at the same time, the cable conductor 37–2 is connected to the center taps of the potentiometers 248 and 249. The cable conductors 37–1 and 37–2 are connected in the surface equipment to a recording galvanometer 315 in the recording apparatus 55 as is illustrated in FIG. 13 and, hence, this galvanometer functions to produce a curve on the recording medium 56 corresponding to the curve 316 shown in FIG. 12. Thus, during each of the relatively long periods, when the pole 299c is in engagement with the fixed contact 299a the difference of potential existing between the wiper 249a and the center tap of the potentiometer 249 is impressed across the cable conductors 37–1 and 37–2 in order to record the curve portions indicated by each of the reference numerals 317. Similarly, when the pole 299c is moved by the cam 300 into engagement with fixed contact 299b, the difference of potential existing between the wiper 248a and the center tap of the potentiometer 248 is impressed across the cable conductors 37–1 and 37–2 so that the recording galvanometer 315 functions to produce the curve portions indicated at 318. The direction of deviation of each of the curve portions 317 from the center line indicated at 319 is a measure of the direction of inclination of the borehole 30 in the east-west direction, i.e., when the curve portion 317 lies to the left of line 319 the borehole is inclined in the west direction while inclination of the borehole to the east is indicated when the curve portion 317 lies to the right of the center line. The magnitude of the deviation of each curved portion is a measure of the east-west component of the angle of inclination of the borehole at the depth corresponding to that particular curve portion. In similar manner, the direction of deviation of each curve portion 318 from the center line 319 indicates the direction of inclination of the borehole in the north-south direction, that is, when the curve portion 318 lies to the left of the center line the borehole inclines to the south and when it lies to the right of the center line the inclination is to the north. The magnitude of each curve portion 318 is, of course, a measure of the north-south component of the borehole inclination at the depth corresponding to that particular curve portion. If either or both of the curve portions 317 and 318 change in magnitude or in direction of deviation from the center line 319 an indication is provided that the inclination of the borehole has changed and this factor must be considered in the computation of the strike and dip from the curve produced by the sensing elements 70, 71 and 72.

Once during each revolution of the shaft 303, the movable poles 309 and 310 are moved into respective engagement with the fixed contacts 312 and 314, thus breaking the circuit to the cable conductors 37–1 and 37–2 from the potentiometers 248 and 249 and, at the same time, connecting these cable conductors directly across the calibrating resistor 298. The fixed voltage drop across the calibrating resistor may be used to calibrate the curve portions 317 and 318 since this voltage drop creates a calibrating portion 320 on the curve 316 which has a magnitude dependent upon the voltage drop across the calibrating resistor. If the potential drop across resistor 298 should change as, for example, by a change in the voltage developed by the source 295, the curve portions 320 will indicate both the occurrence and the magnitude of the change so that its effect may be considered in analyzing the curve portions 317 and 318 to determine the direction and inclination of the borehole. In this connection, it will be observed that the apparatus of the present invention is useful in measuring borehole inclinations even without the dipmeter curves produced from the sensing elements 70, 71 and 72.

Turning now to the operation of the logging apparatus described above and referring particularly to FIG. 13 of the drawings, it will be observed that the downhole tool 36 is supplied with power from an A.C. source such as a generator 325 which is connected at one side to the sheath or outer shield 326 of the cable 37 and which is connected at its other side to supply A.C. power through condenser 327 to conductor 328. The conductor 328 is connected to the cable conductor 37–3 through a manually operated switch 329 having two positions, namely, a logging position shown in FIG. 13 and a switching position. Specifically, when the switch 329 is in its logging position, its movable pole 330 engages fixed contact 331 to connect conductor 328 to the cable conductor 37–3 while movement of the switch 329 to the switching position throws the pole 330 into engagement with fixed contact 332 to connect the cable conductor 37–3 through a manually operated switch 333 to one terminal of a D.C. power source 334 having its other terminal connected directly to the sheath 326.

When the downhole tool 36 is being lowered into the borehole to prepare for the logging operation, the switch 333 is opened and the pole 330 of the switch 329 is moved into engagement with the fixed contact 332. As soon as the downhole tool 36 has reached the predetermined depth in the borehole 30 the pole 330 is thrown into engagement with the fixed contact 331 whereupon A.C. current from the source 325 flows through conductor 328 and through cable conductor 37–3 to a first movable pole 335 of a stepping switch 336. The latter switch is a three pole switch actuated in a manner described more fully hereinafter from the surface equipment by closing the switch 333 and has three positions, namely, an A or OFF position illustrated in FIG. 13, a first logging position designated as B and a second logging position indicated at C. While the tool is being lowered the three poles 335, 337 and 338 of the stepping switch occupy the A position illustrated in FIG. 13 and, as a consequence, cable conductor 37-3 is connected through engaged contact 335a, through conductor 339 and through condenser 340 to the primary winding of an igniter supply transformer 341. A.C. power from the source 325 is thus impressed across the primary winding of the transformer 341 to excite its secondary winding which is connected to the igniter 91 for releasing the sensing elements 45 and to the release mechanism for the centralizer arms 50. Supply of power to the release mechanisms, of course, severs the bands 68 and 69 holding the centralizer arms and the sensing elements in retracted position with the result that they are moved outwardly and into engagement with the walls of the borehole. When the centralizer arms and the sensing elements have been extended so that they occupy the positions illustrated in FIGS. 5 and 6, the recording apparatus is adjusted as described below and the equipment is in condition to start the log. The log is, of course, produced by raising the tool 36 through the borehole at uniform speed until all of the desired zone of the well has been logged.

The logging operation is initiated by moving the switch 329 to its switching position wherein its pole 330 engages the fixed contact 332 and by thereafter closing the manually operated switch 333 to complete a circuit from one side of the D.C. source 334 through a cable conductor 37-3 through operating coil 342 of a remotely controlled downhole relay 343 and through a resistor 344 to the outer sheath 326 of the cable which, as indicated above, is connected to the opposite side of the D.C. source 334. The relay 343 is of the type which remains energized as long as its operating coil 342 is supplied with D.C. current. The relay 343 is, of course, operated by the D.C. current from source 334 with the result that its pole 345 is moved out of engagement with fixed contact 345a and into engagement with fixed contact 345b. When the pole 345 engages the fixed contact 345b, a circuit is completed from the cable conductor 37-3 through the operating coil 346 of the stepping relay 336 to the sheath 326. The stepping relay 336 is of the type which is actuated through one step each time that its operating coil 346 is supplied with D.C. current. Thus, when the D.C. current from the source 334 passes through the coil 346, the stepping switch is actuated from its A position to its B position so that the pole 335 is moved out of engagement with fixed contact 335a and into engagement with fixed contact 335b whereupon a circuit is completed from cable conductor 37-3 to conductor 348. This circuit remains completed until the stepping switch 336 is next actuated from the surface equipment by reclosing the switches 329 and 333. After the downhole stepping switch 336 has been actuated to the B position, the switch 333 is opened to break the D.C. circuit energizing the relays 336 and 343 and the surface switch 329 is moved back to its logging position with its pole 330 in engagement with the fixed contact 331. The switch 329, of course, functions in the manner described above to deliver A.C. current from the source 325 to the cable conductor 37-3. The impedance of the coil 342 and the resistor 344 is such that little or no current from the A.C. source passes through them and, as a consequence, the interruption of the circuit from the D.C. source 334 to the coil 343 causes the pole 345 to return to engagement with the fixed contact 345a, thereby breaking the energizing circuit to the coil 346 of the stepping relay 336. Movement of the pole 345 back into engagement with fixed contact 345a also completes a circuit from conductor 37-3 through inductor 349 and through a condenser 350 connected in parallel with the caliper potentiometer 237 to the sheath 326. Inductor 349 and condenser 350 are so chosen that they present a very high impedance to the frequency of the alternating current from the source 325, but the coil 349 has a relatively low D.C. resistance so that this coil and the potentiometer 237 present a relatively low impedance to D.C. current. The resistance of the potentiometer 237 is measured in the surface equipment by a bridge circuit indicated generally by the reference numeral 351. This bridge circuit is powered by a suitable source of D.C. current such as battery 352 and includes three branch resistors 353, 354 and 355 in the surface equipment together with the caliper circuit including the potentiometer 237, condenser 350 and inductor 349 in the subsurface equipment or downhole tool 36. The caliper circuit, of course, forms the fourth arm of the bridge 351. An inductor 356 and a condenser 357 in the surface equipment present a very high impedance to the A.C. current from the source 325 and, hence, prevent the latter current from affecting the operation of the bridge 351. A recording galvanometer 358 forming a part of the recording apparatus 55 referred to above is connected in the bridge circuit 351 for the purpose of continuously indicating the changes in the resistance of potentiometer 237, thereby to provide a continuous indication on the recording medium 56 of the diameter or radius of the borehole at the various depths traversed by the downhole tool or, more particularly, by the sensing element 70 during the logging operation. The caliper curve produced by the recording galvanometer 358 is identified by the reference numeral 360 in FIG. 12.

When the pole 335 of the stepping switch 336 is moved into engagement with the fixed contact 335b the A.C. current from the source 325 passes from the conductor 37-3, through closed contact 335b, through the conductor 348, through D.C. blocking condenser 361, through conductor 362, through the slip ring and brush assembly 105, through conductor 363 and through the motor 100 to the cable sheath 326. Thus, as indicated above, throughout the logging operation, the motor 100 is continuously energized with A.C. current from source 325 so that its output shaft turns continuously and at full speed. Of course, instead of employing a continuously running motor and a pair of selectively actuated clutches, a polarized switch, or the like could be used to start a motor in the proper direction of rotation in response to signals from the cells 133 and 134.

The condenser 361, of course, blocks the D.C. current used in the control of the relays 343 and 336 as well as the D.C. current for the caliper measurement. A.C. current from the source 325 is also passed to the inclinometer power source 295 so that the inclinometer apparatus 48 functions in the manner previously described to provide cable conductors 37-1 and 37-2 with signals representing the direction and inclination of borehole as well as a calibration signal for the north-south and east-west inclinometer signals. The A.C. current from the source 325 is also supplied to a circuit 365 for supplying current through resistors 366, 367 and 368 to the current electrodes of the sensing elements 70, 71 and 72. In FIG. 13, the current electrode for the sensing element 70 has been designated by the reference numeral 70-75 while the current electrode for the sensing element 71 has been designated 71-75 and the current electrode for the sensing element 72 has been designated 72-75. The measuring electrodes, which are respectively designated 70-76, 71-76 and 72-76, are respectively connected through transformers 369, 370 and 371 to electronic circuits 372, 373 and 374 to the cable conductors 37-4, 37-5 and 37-6. The components of the power supply 295, circuit 365, transformers 369, 370 and 371, circuits 372, 373 and 374 etc. form part of the electronics equipment contained within the housing 49 of the lower tool section. Each of the circuits 372, 373 and 374 may include suitable amplifiers for the A.C. signals appearing between the measuring electrodes of each of the sensing elements and ground, rectifier circuits for converting the A.C. signals to D.C. signals and other circuits such as filters for forming the resistivity signals prior to their transmission to the surface. The D.C. signal output from the circuits 372, 373 and 374 is passed through cable conductors 37-4, 37-5 and 37-6, respectively, to recording galvanometers 375, 376 and 377 in the recording apparatus 55. The galvanometers 375, 376 and 377 function to produce three resistivity curves respectively indicative of the difference of potential existing between the measuring electrodes of sensing elements 70, 71 and 72 and a reference point such as ground or a remote electrode. These three curves appear on the recording medium 56 in the form indicated by the reference numerals 378, 379 and 380 in FIG. 12.

The signals from the light sensitive cells 133 and 134 of the azimuth sensing mechanism 47 are passed through suitable electronic circuits 381 and 382 which may include amplifying equipment and the like in order to develop signals for controlling the relays 383 and 384 which complete circuits to the poles 337 and 338 of the stepping switch 336. At this time it will be recalled that the pole 337 is in engagement with the fixed contact 337b and, hence, the relay 383 is connected through conductor 385 through the slip ring and brush assembly 105 and through conductor 386 to the clutch 101 while relay 384 is connected through conductor 387 through the slip ring and brush assembly 105 and through conductor 388 to the clutch 102. The azimuth sensing mechanism 47 cooperates with its associated amplifiers, relays and switches in the manner previously described to control the energization of the clutches 101 and 102 to maintain the lower tool section 41 permanently oriented along the predetermined azimuth. The lower tool section 41 is maintained along this azimuth throughout the logging operation by the selective energization of the clutches 101 and 102 in the manner described above so that preoriented signals are transmitted via the cable 37 to the recording apparatus 55.

Before the logging operation commences, the recording apparatus 55 is adjusted so that the various curves produced are of the desired intensity and appear in proper positions on the recording medium 56. To this end, the longitudinal positions of the galvanometers 315, 358, 375, 376 and 377 with respect to the recording medium are adjusted until the small luminous spots created by these galvanometers lie along a line extending laterally of the recording medium. The lateral positions of these galvanometers with respect to the recording medium are then adjusted so that the curves will be spaced sufficiently to permit proper interpretation. The sensitivity of the galvanometer 315 for recording the inclinometer curve 316 is then adjusted until the calibrating portion 320 falls onto the proper deviation line. The recording galvanometer 358 for the caliper curve 360 is also adjusted for proper calibration. When all of these adjustments have been made, the recording apparatus is conditioned to start the log.

In accordance with a very important feature of the present invention, a second log may be run with the positions of the sensing elements 70, 71 and 72 changed or reversed. Specifically, after the first run through the borehole has been completed to record a complete set of curves as described above, the tool may again be lowered to the predetermined depth and, with the centralizer arms and the sensing elements extended, the pole 330 of the switch 329 may be moved into engagement with fixed contact 332 and the manually operated switch 333 may be closed in order to complete a circuit to deliver D.C. current from the source 334 to the operating coil 342 of the relay 343. It will be recalled that operation of the relay 343 completes a circuit to the operating coil 346 of the stepping relay 336 so that the poles 335, 337 and 338 of the stepping relay are advanced one step from position B to position C whereupon pole 337 is moved into engagement with fixed contact 337c, pole 338 is moved into engagement with fixed contact 338c and pole 335 is moved into engagement with fixed contact 335c. Under these conditions, the relay 383 is connected through slip ring and brush assembly 105 and through conductor 388 to the clutch 102 while the relay 384 is through the slip ring and brush assembly 105 and through conductor 386 to the clutch 101. It will be recognized that the connection between the relays 383 and 384 and the clutches 101 and 102 have been effectively reversed by moving the stepping relay from its B position to its C position. Since the contacts 335b and 335c are connected together the movement of the pole 335 from the second position to the third position has no effect on the circuit operation. The reversal of the connection between the relays and the clutches, however, causes the drive mechanism 52 to rotate the lower tool section 41 through one-half of a revolution so that the sensing elements 70, 71 and 72 are aligned along an azimuth which is 180° removed from the predetermined azimuth along which the previous run or log was made. This reversal is accomplished from the surface without removing the downhole tool 36 from the borehole and, as a consequence, the second log can be produced without a large time loss. The azimuth sensing mechanism 47 will function during the production of the second log to maintain the downhole tool section along the new azimuth throughout the logging operation. During the second logging operation, the caliper curve, the inclinometer curve and the three resistivity curves are again produced and these curves can be compared with those obtained during the first run in order to confirm the results in order to make certain that the tool has functioned properly throughout both of the logging operations. In the event that the information concerning the dip and strike of the various strata traversed by the tool differ in the two logging operations, the analyst should have sufficient information available to determine which of the runs is accurate. Moreover, by averaging the readings obtained for the two orientations of the lower tool section 41, all errors due to inaccuracy in the positioning of the electrodes or contacts on the pads 73, all errors due to inaccuracy in centering the downhole tool 36 within the borehole and other similar errors are compensated and eliminated. In addition, in the event that the borehole 30 passes directly through a fault or break in one of the interfaces 34 or 35, the curves produced during the two runs will indicate the existence of such a condition. In prior art systems where only a single set of curves is produced from sensing elements constantly changing in azimuth, the existence of such a fault would be extremely difficult if not impossible to detect.

While the reversal of the connection between the clutches 101 and 102 and the cells 133 and 134 has been illustrated as occurring between the relays and the slip ring and brush assembly 105, it will be understood that the switching could take place at any point between the output of the cells and the input to the clutches. Moreover, the effective reversal of the position of the sensing elements for the two runs can be accomplished in many other ways, as, for example, by providing a different set of light sources and photocells and by providing switches for rendering the different light sources effective. By using an arrangement of the latter type, that is, by providing a number of different light sources and corresponding light sensitive cells, several interesting curve variations may be obtained. Thus, instead of effectively turning the sensing elements through 180° for the two different curves, it is possible to adopt any other angle of change as, for example, a 120° change as illustrated in FIG. 21. By turning the downhole tool through 120°, the sensing elements are so disposed that the current electrode 70–75 and its associated measuring electrode 70–76 occupy the positions previously occupied by electrodes 72–75 and 72–76, while electrodes 71–75 and 71–76 occupy the positions previously occupied by electrodes 70–75 and 70–6 and electrodes 72–75 and 72–76 occupy the positions previously occupied by electrodes 71–75 and 71–76. If the different logs obtained with the 120° displacement are correct, the resistivity curves produced on the different runs should be identical except, of course, that these curves will be produced from a different sensing element during each run through the borehole.

Figure 14:
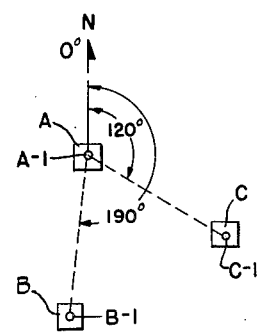
FIG. 14 is a plan view of a typical oil field layout and shows several spaced apart boreholes in which dip measurements may be made or predicted in accordance with a new logging method employing the apparatus shown in FIGS. 1 to 13.

In the prior art arrangements presently in use, all of the dip determinations are computed with respect to north by relating the azimuth measurements, the borehole inclination and direction measurements, the borehole diameter measurements and the sensing element measurements to north. Frequently, however, dip measurements with respect to a direction other than true north are desirable. For example, in the exploration of a possible oil producing area it is conventional practice for the exploration company to obtain oil or mineral leases on different spaced apart tracts of land spotted throughout the area. This practice is known as "checkerboarding" and involves obtaining leases on tracts scattered in a pattern through the entire area, as, for example, the tracts designated as A, B and C in FIG. 14. The practice is adopted in order to avoid the prohibitive expenses involved in obtaining leases on the entire area before the value of the oil or mineral rights has been explored or determined. After leases on the tracts such as A, B and C have been obtained and after a borehole or well A-1 been drilled in tract A and logged to determine the nature of the subsurface formations including a determination of the dip of one or more strata adjacent the borehole A-1 running through the area, it frequently becomes desirable to be able to predict the dip of the same strata in the formations surrounding the borehole B-1 or in the formations surrounding the borehole C-1. In prior art arrangements, such a prediction is made by making all of the computations on a point by point basis with respect to a direction corresponding to the relationship between boreholes A-1 and B-1. Specifically, since the borehole B-1 lies along a line bearing 190° from true north, which is arbitrarily assigned a 0° bearing, all of the measurements are related to a plane passing vertically through the imaginary 190° line connecting A-1 and B-1. To predict the dip of the same strata at the borehole C-1, the measurements made in the borehole A-1 are, of course, related to a vertical plane lying at 120°. The computations involved in so relating the measurements and making the dip computations are extremely complicated and, hence, are both laborious and time consuming. In accordance with an important feature of the present invention, this complicated procedure may be avoided by orienting the light sources 128 and 129 and the cells 133 and 134 along a line extending at 190° with respect to the north-south line of the magnet. This orientation may be effected prior to insertion of the tool 36 into the borehole A-1 by turning the member 122 until the light sources and their associated light sensitive cells are properly positioned. Suitable indicators may be employed to determine the angular position assumed by the light sources and the cells. A log is then run in the manner described above with the azimuth sensing mechanism 47 and the drive mechanism 52 functioning to maintain the lower tool section oriented along the 190° line. The dip measurement obtained from the log will, of course, indicate the dip of the strata passing through both of the boreholes A-1 and B-1 assuming that these strata are planar throughout the area. The same procedure may be followed to predict the dip of strata passing through borehole C-1 by aligning the light sources 128 and 129 and the cells 133 and 134 along a line extending at 120° from true north. Thus, it will be observed that the present invention provides a greatly simplified method for predicting the dips of strata throughout the area under investigation.

As was mentioned above, the azimuth sensing mechanism 47 may take a number of different forms. Thus, in FIG. 15 there is illustrated a different arrangement for supporting the cutout disc 132 so that the light sources 128 and 129 may be moved relatively close to their associated light sensitive cells 133 and 134. In the arrangement there illustrated, needle supports 390 and 391 respectively extend upwardly and downwardly from the disc 132 and the magnet 135 and are supported at their ends by miniature pivot bearings 392 and 393. Very low friction coefficient bearings are employed due to the fact that the earth's magnetic field provides only a small amount of torque for operating the magnet 135 and the disc 132. By providing supports both above and below the disc 132, the latter does not tilt toward or away from the sources and the cells and, as a result, the distance between each light source and its light sensitive cell may be maintained constant and very short despite varying inclination of the borehole. Since the light source and the light collecting cell are disposed relatively close together, a much stronger signal can be produced with a result that the electronic amplifiers associated with each cell can be eliminated or at least severly reduced.

Figure 15:
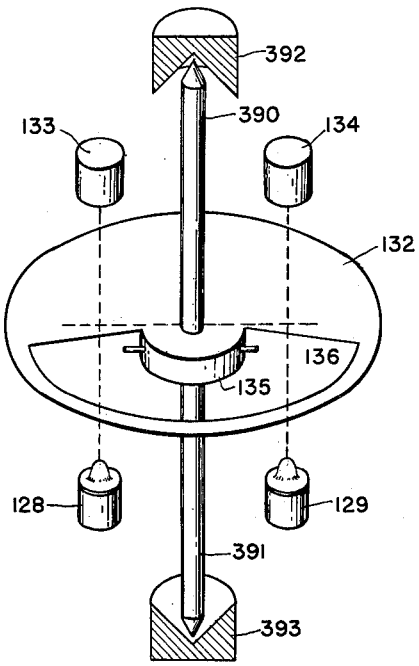
FIG. 15 illustrates diagrammatically an alternative arrangement of the azimuth sensing mechanism.

In systems of the type shown in FIG. 15, it is imperative that the components be perfectly balanced mechanically due to the effect of the vertical unbalance moment present when the angle of borehole inclination is relatively large. To reduce the effects of the unbalance moment, an arrangement of the type illustrated in FIG. 16 may be employed which differs from the arrangement shown in FIG. 15 principally by the construction of the lower bearing or pivot. Specifically, in the arrangement shown in FIG. 16 the major portion of the mass of the system, that is, the magnet, has been shifted below the lower bearing for the disc and suspended so that it creates little or no unbalance in the system even when the borehole inclination becomes relatively large. To this end, a support shaft 395 secured to the underside of the disc 132 is rotatably journalled within a bearing assembly 396 forming the lower pivot for the assembly. A magnet 397 is secured upon the lower end of a rod 398 having its upper end connected to the shaft 396 through a universal joint 399 of the ball socket and pin slot type. By this construction, the magnet remains stationary while the tool pivots about the universal joint 399 when the angle of inclination of the borehole changes while any change in azimuth of the lower tool section causes the light sources and cells to turn with respect to the disc 132. The magnet is located well below the bearing 396 in order to reduce the effect of unbalance and, at the same time, to permit very short spacing between the light sources and their associated light sensitive cells. In both of the arrangements shown in FIGS. 15 and 16, the pivot friction can be reduced by employing a buoyant chamber on the disc 132 coacting with the transparent fluid in the chamber 120 to provide partial support for the disc.

Figure 16:
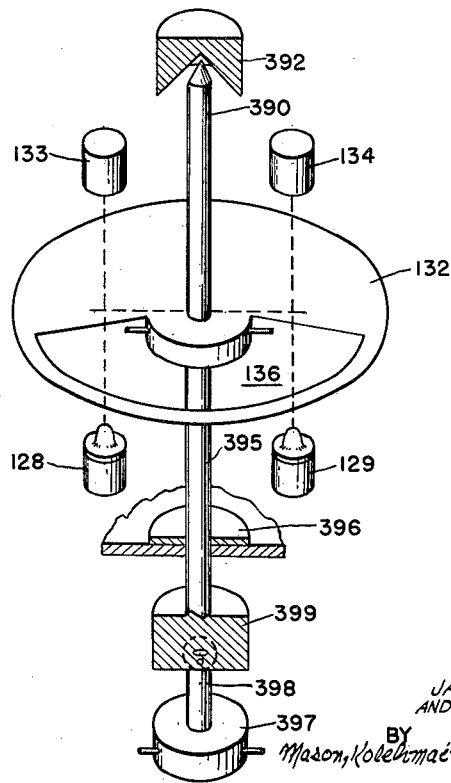
FIG. 16 illustrates diagrammatically another modification of the azimuth sensing mechanism.
Figure 17:
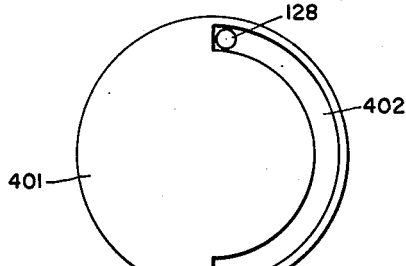

Moreover, the cutout disc 132 illustrated in FIGS. 8, 15 and 16 may take a number of different forms. For example, the disc may be constructed as shown in FIG. 17 wherein it is provided with an elongated arcuate slot 402 subtending an angle of 180° from the center of the disc 401. With a disc of this type a single light responsive cell, for example, the cell 133, would be used to control the energization of its associated clutch. When the disc 401 is in the position illustrated in FIG. 17, the light source 128 is exposed to its light responsive cell 133 in which case one of the clutches 101 or 102 (depending upon the position of the stepping switch 336) would be energized to drive the lower tool section 41 in proper direction to move the solid portion of the disc 401 between the source 128 and the cell 133. When the light to the cell 333 is cut off a circuit (not shown) is automatically rendered effective to energize the other clutch and cause the lower tool section to be rotated in the reverse direction. Thus, the downhole tool section would tend to hunt about the predetermined azimuth and would deviate from this azimuth only to the extent necessary to actuate the clutches. The principal advantage of the system illustrated in FIG. 17 is the reduction in the number of component elements required in that only one light source, a single light sensitive cell, a single amplifying device and a single relay are required.

Figure 18:
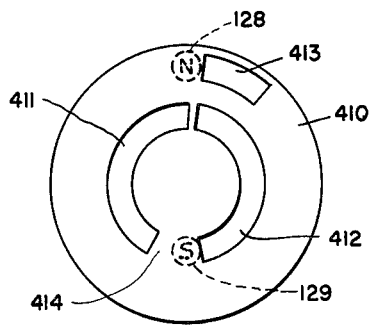
Figure 19:
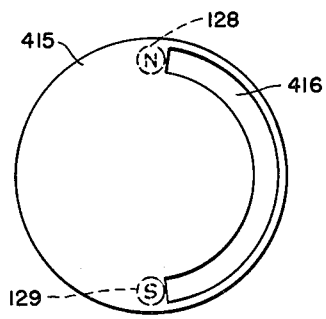

Other possible arrangements of the cutout disc are illustrated in FIGS. 18 and 19. FIG. 18 illustrates a disc 410 provided with a pair of elongated, arcuate opening or slots 411 and 412 and a relatively small arcuate slot or opening 413 spaced outwardly from and concentric with the arcuate slots 411 and 412. The opening 413 is adapted to control the passage of light from the source 128 to the light sensitive cell 133 while the slots 411 and 412 and the solid disc portion 414 disposed therebetween are adapted to control the passage of light from the source 129 to the light sensitive cell 134. The blank space 414 separating the slots 411 and 412 spans approximately the same angle as the arcute opening 413. As long as the downhole tool 36 is aligned along the predetermined azimuth, the light to both of the cells 133 and 134 is blocked with the result that neither of the clutches 101 nor 102 is energized. In the event that the lower tool section 41 tends to turn to move the light sources and the cells in a clockwise direction as viewed in FIG. 18, the disc 410 remains in nearly fixed position due to the action of the magnet (not shown) which it carries and, hence, the light from the source 128 is admitted to the cell 133 to energize one of the clutches in the manner indicated above in order to drive the lower tool section in a counterclockwise direction and return the light sources to the positions illustrated in FIG. 18. Obviously, when the light sources rotate in a clockwise direction as described above, the blank space 414 blocks the light from the source 129 to the cell 134 and, hence, the latter cell has no effect on the circuit operation. If, on the other hand, the downhole tool section tends to rotate in a direction which causes the light sources to rotate in a counterclockwise direction as viewed in FIG. 18, the elongated slot 412 admits light from the source 129 to the light responsive cell 134 with the result that the lower tool section 41 is turned in a direction to restore the light sources to the positions indicated by the broken lines in FIG. 18. When the light sources are turned in a counterclockwise direction, the light from the source 128 is blocked so that it does not reach the cell 133.

In FIG. 19 a disc 415 is illustrated which functions normally to block the light from both of the sources 128 and 129 to their associated cells. To this end, the disc 415 is provided with an elongated slot 416 which spans slightly less than 180° of the disc. As long as the downhole tool section 41 is maintained along the predetermined azimuth, the light sources remain in the positions illustrated in FIG. 19 with respect to the disc so that the light to both of the cells 133 and 134 is blocked. If the tool section 41 tends to rotate so that the light sources move in a clockwise direction as viewed in FIG. 19, the elongated slot 416 functions to admit light from the source 128 to the light sensitive cell 133 whereupon one of the clutches 101 or 102 is energized to drive the downhole tool section in a direction tending to restore the light sources to the positions indicated by the broken lines in FIG. 19. Similarly, if the lower tool section 41 tends to rotate in a direction to move the light sources in a counterclockwise direction as viewed in FIG. 19, the elongated opening 416 functions to admit light from the source 129 to the light responsive cell 134, thereby energizing the other clutch and causing the downhole tool section 41 to be driven in a direction tending to restore the light sources to the positions shown in FIG. 19.

Figure 20:
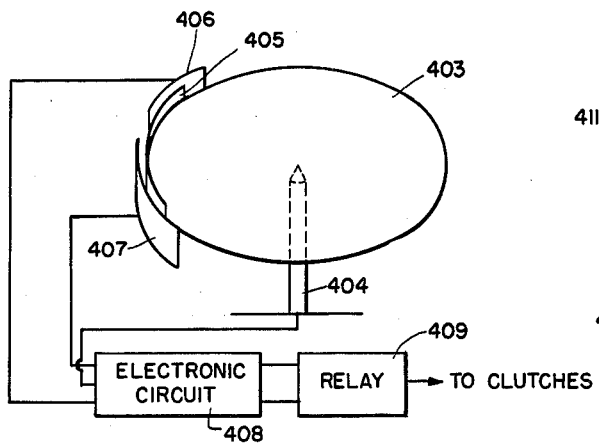
FIGS. 17, 18, 19 and 20 illustrate other modifications of the azimuth sensing mechanism.

In the arrangement shown in FIG. 20 the light sources and cells have been completely eliminated by employing a variable capacitor arrangement including a rotatable disc 403 supported upon a suitable pivot assembly 404 which may be of any of the types illustrated above. The disc 403 carries a magnet (not shown) to control its movement and also carries a metallic vane 405 cooperating with vanes 406 and 407 secured to the lower tool section 41 to form a variable capacitor connected to an electronic circuit 408 for controlling a relay 409 in the operating circuit for the clutches 101 and 102. As long as the vane 405 remains centered with respect to the fixed vanes 406 and 407, the electronic circuit 408 is so conditioned that neither of the clutches 101 and 102 is actuated and, as a consequence, the lower tool section 41 is maintained along a fixed predetermined azimuth. In the event that the lower tool section turns with respect to the fixed azimuth, the movable vane 405 meshes with one of the fixed vanes 406 and 407 and moves away from the other fixed vane, thus changing the values of the capacitors in the circuit 408 in accordance with the movement of the lower tool section. Thus, for example, if the fixed vanes tend to turn in a clockwise direction as viewed in FIG. 17, the capacity existing between the vane 407 and the vane 405 is increased while the capacity existing between the vane 406 and the vane 405 is decreased. This change in capacity may be used to control a tuned circuit for an oscillator or the like in the electronic circuit 408 in order to control the relay 409 to energize the proper clutch for returning the vanes to the center position illustrated in FIG. 20, thereby maintaining the lower tool section 41 along the predetermined azimuth. Obviously, turning of the vanes 406 and 407 in a counterclockwise direction as viewed in FIG. 20 increases the capacity existing between the vane 406 and the vane 405 and decreases the capacity existing between the vane 407 and the vane 405 thereby energizing the other clutch to drive the lower tool section 41 in the reverse direction.

In all of the azimuth sensing mechanism described above, a magnet has been used to control the movement of a disc in order to supply the sensing information. In such systems, all parts of the lower tool section 41 located sufficiently close to the magnet to affect its operation are formed of non-magnetic material so that they do not exert a magnetic influence upon the earth's magnetic field.

In certain types of systems, particularly in logging cased boreholes, it is desirable to use an azimuth sensing mechanism which is unaffected by the magnetic properties of the well casing. To this end, a gyro type sensing mechanism of the type illustrated in FIG. 22 may be employed utilizing a gyro device 420. The gyro may be either of the directional seeking type which is self-aligning or may be of the type where initial directional orientation is required but in both cases, the gyro is unaffected by the earth's magnetic field or by the presence of magnetic material in the earth formations surrounding the borehole. The gyro may also be of the compass control type wherein a magnetic compass is used to correct and control the gyro system. When the lower tool section 41 deviates from the predetermined azimuth in a first direction, the gyro device 420 functions to complete a circuit to fixed contact 421 in order to energize one of the clutches 101 or 102 to drive the lower tool section 41 in a direction to restore it to the predetermined azimuth. In similar manner, when the lower tool section 41 deviates in the opposite direction a fixed contact 422 is engaged to complete a circuit to the other clutch in order to drive the lower tool section in the opposite direction and again restore it to the predetermined azimuth.

The azimuth sensing mechanism 47 may also take other forms as, for example, a specially constructed switch arm and contacts with the arm being attached to a magnet and the contacts being attached to the body of the tool. In this manner when the tool tends to rotate the switch arm contacts one of the stationary contacts to complete a circuit to the appropriate clutch for correcting the tool orientation, while movement of the switch arm in the opposite direction completes a circuit to the other clutch.

Instead of cutting out the disc in the manner illustrated in FIGS. 8, 15, 16, 17, 18 and 19, the light may be controlled by attaching appropriate mirrors to the disc and reflecting the light to the photosensitive cells which are operated in the manner indicated above to maintain the downhole tool section along the predetermined azimuth.

FIG. 23 illustrates diagrammatically a warning system which may be incorporated in the apparatus of the present invention to keep the operator informed as to the operating conditions of the apparatus. This warning system includes a disc 425 having a pair of spaced apart concentric arcuate openings 426 and 427 therein for controlling the light passing from a source 428 to a photosensitive cell 429. As long as the tool section 41 is properly oriented, the light from the source 428 is continuously passed through the opening 426 (when the stepping relay is in the B position) to the light sensitive device or cell 429. The light sensitive cell 429 functions to operate a switch circuit 430 to maintain a switch 431 shown in FIG. 13 in closed condition. In the event that the orienting system for the lower tool section 41 fails to function properly, the disc 425 will rotate to such an extent that the light from the source 428 to the light sensitive cell 429 is interrupted, thus causing the circuit 430 to open the switch 431. When the switch 431 is opened the curve recorded by the galvanometer 376 at the earth's surface disappears, thus informing the operator that the orienting system for the downhole tool is no longer functioning. The opening 427 functions to control the flow of light from the source 428 to the light responsive device 429 when the stepping switch 336 is in the C position described above. The widths of the openings 426 and 427 correspond to the precision desired in the orienting system for the downhole tool and, hence, as long as the latter system is functioning properly light will, at all times, pass from the source 428 to the light responsive cell 429. Of course, the warning system may take a number of forms other than the removal of one of the resistivity curves in the manner described above and may, for example, result in energization of an alarm or a signal light which indicates to the operator a malfunction in the downhole tool. The disc 425 need not be separate from the disc 132 or the other discs described above since each of these could be provided with light controlling openings for energizing the warning system.

After the curves have been produced by running the tool 36 through the borehole in the manner described above, the results are interpreted in conventional manner except that corrections for the changing azimuth of the downhole tool are no longer necessary. Thus, resistivity curves 378, 379 and 380 are analyzed by noting the signals corresponding to the changing resistivities produced when the sensing elements pass over one of the interfaces such as the interfaces 34 and 35 illustrated in FIG. 1. When the sensing element passes over an interface, indications appear on the curves as indicated at 378a, 379a and 380a and the dip and strike of the interface is determined by measuring the displacements $Z_1$, $Z_2$ and $Z_3$ between the three signals 378a, 379a and 380a. The measured displacements are then correlated with the auxiliary information concerning the borehole diameter at this particular depth and the direction and inclination of the borehole at this depth and all of this information is used to calculate the azimuth and the dip of the borehole formation either by direct calculation or by reference to specially prepared charts (not shown). The same procedure is followed for the log recorded with the sensing elements 70, 71 and 72 effectively reversed and the results obtained during the second run are compared with those obtained during the first log for confirmation. The calculations are, of course, greatly simplified since all of the recorded signals are preoriented and, hence need not be corrected for or correlated with the azimuth of the downhole tool.

In the arrangement shown in FIG. 13, the tool section 41 is automatically oriented by means of a directional sensing system and associated control elements are located entirely within the subsurface tool. In some operations, it may be desirable to control the movement of the tool section 41 either manually or automatically from the surface and, to this end, an arrangement of the type illustrated in FIG. 24 may be employed. As there shown, a multiconductor cable 440 is connected between the downhole tool and the surface equipment. The azimuth sensing mechanism 47, the motor 100, and its associated components may be of the type described above but in this case, the clutches 101 and 102 are connected through cable conductors 440–1, 440–2 and 440–3 to a suitable source of power 441 in the surface equipment. The cells 133 and 134 are connected through cable conductors 440–4, 440–5 and 440–6 and through a six pole, two-position automatic-manual switch 444 to indicating meters 442 and 443 in the surface equipment. The switch 444 is illustrated in FIG. 24 in its manual position wherein the meters 442 and 443 are connected to the conductors 440–4, 440–5 and 440–6 in order to indicate the signals from the cells 133 and 134. In the event that the meters 442 and 443 indicate that the orientation of the lower tool section 41 has deviated from the predetermined azimuth, the operator at the surface throws a manually operated, single pole, three-position switch 445 either to the left or to the right to correct the orientation. In the left hand position, the clutch 101 is energized to drive the shaft 42 in a first direction while when the switch 445 is thrown to its right hand position, the clutch 102 is energized to drive the shaft 42 in the reverse direction. The operator is informed by the indications on the meters 442 and 443 of the direction of rotation required to bring the lower tool section back to the predetermined azimuth and from this information is able to determine whether the switch 445 should be thrown to the right or to the left. As soon as the meters 442 and 443 indicate that the lower tool section has been restored to the predetermined azimuth the switch 445 is thrown to its center or off position so that neither of the clutches 101 and 102 is actuated.

When the automatic-manual switch 444 is thrown to the automatic position, the circuit to the meters 442 and 443 is broken and the signals from the cells 133 and 134 are supplied directly to the circuit 441. The manually operated switch 455 is removed from the circuit so that the energization of the clutches 101 and 102 is controlled through the circuit 441 by the signals from the photosensitive cells 133 and 134. As was indicated above, deviation of the downhole tool from the predetermined azimuth in a first direction resuults in automatic energization of a first of the clutches to drive the lower tool section 41 in a direction to restore the tool section to the predetermined azimuth while deviation of the downwhole tool in the opposite direction results in the energization of the other clutch to turn the lower tool section 41 in the opposite direction. In this manner, the orientation of the lower tool section 41 along a fixed azimuth is automatically maintained.

In the foregoing description it has been assumed that it is desired to produce three resistivity logs from the sensing elements 70, 71 and 72. However, the tool will also function as a self-potential recording dipmeter by utilizing sensing elements which function to supply natural earth potentials to the surface equipment. Thus, as illustrated in FIG. 25, sensing elements 470, 471 and 472 may be employed in place of the sensing elements 70, 71 and 72 described above in order to supply to electronic circuits 473, 474 and 475 signals representing the natural earth potentials. The natural earth potentials are developed by electrodes 470a, 471a and 472a biased into engagement with the walls of the borehole by spring loaded mechanism of the type described above. The signals supplied to the circuits 473, 474 and 475 are amplified and filtered and the resulting D.C. signals are passed via cable conductors 37–4, 37–5 and 37–6 to the surface equipment where they are supplied to recording galvanometers 476, 477 and 478 to produce three side-by-side self potential curves similar to the resistivity curves described above. The remaining portion of the apparatus may, of course, be identical to that illustrated in FIG. 13 and, hence, only the self-potential measuring equipment has been illustrated in FIG. 25. It will be understood, therefore, that the only change necessary to convert the system illustrated in FIG. 13 to a self-potential recording dipmeter is to replace the component elements enclosed within the block 479 (FIG. 13) with the elements enclosed within the block 480 (FIG. 25). Of course, it will not be necessary to supply A.C. power to the sensing elements 470, 471 and 472 and, for this reason, the input connections from the conductors 362 and 481 may be eliminated. Moreover, since the self-potential recording galvanometers are conventionally connected to a ground electrode at the earth's surface the common return line 37-2 for galvanometers 476, 477 and 478 need not be employed.

It is apparent that the apparatus of the present invention is also useful for maintaining a fixed orientation of the downhole tool in logging equipment of the caliper type as described in the above-identified Boucher Patent No. 2,640,275. In arrangements of this type, the equipment within the block 479 in FIG. 13 may be replaced with equipment enclosed within the block designated by the reference numeral 492 in FIG. 26. In the arrangement there illustrated three caliper arms 482, 483 and 484 are mounted in a common plane on the downhole tool and are biased into engagement with the walls of the borehole. These arms act through mechanical connections indicated by the broken lines 485, 486 and 487 to drive wipers 488a, 489a and 490a of caliper potentiometers 488, 489 and 490. The caliper potentiometers are supplied with D.C. power from a suitable source 491 and the signals developed across these potentiometers are supplied through cable conductors 37-4, 37-5, 37-6 and 37-2 to the surface equipment. The latter cable conductors are connected to recording galvanometers 375, 376 and 377 which perform the same functions as the correspondingly numbered recording galvanometers illustrated in FIG. 13. Thus, these galvanometers produce three curves respectively indicative of the diameter or radius of the borehole traversed by the caliper arms 482, 483 and 484. These three curves can be employed in the manner described in the above-identified Boucher patent to determine the dip and strike of the subsurface strata under investigation.

In view of the foregoing description it will be observed that the apparatus of the present invention is adapted to provide all of the information necessary to determine the dip and strike of the subsurface interfaces while utilizing a cable employing a minimum number of conductors extending between the surface equipment and the downhole tool. At the same time, the downhole tool or at least the major components thereof are maintained permanently oriented within the borehole during the logging operation, thus simplifying the calculations necessary to analyze and interpret the information derived from the log. The tool also provides for an effective check on the information gathered in order to increase the accuracy of the recorded information and to make certain that the apparatus is functioning properly throughout the logging operation. All of these results are achieved with equipment which is simply constructed but which is nevertheless effective in operation.

While the apparatus for orienting the downhole tool with respect to a predetermined azimuth has been described in conjunction with an instrument for measuring the dips of strata in the subsurface formations, it will be apparent that it might be employed in any application where it becomes desirable to maintain the downhole equipment permanently oriented in azimuth. Thus, for example, the orienting system may be used to control the orientation of such tools as a sample taker or core gun, a perforating gun, tools for setting whipstock in the well, tools for marking the orientation of cores in the walls of the borehole prior to cutting and other similar devices.

It will also be apparent that the angular relationship of the pendulums is not limited to the right angle mounting arrangement shown and described. It will be recalled that the description of the inclinometer portion of the present invention set forth above describes the use of two pendulum sections mounted so that the signals generated by the movement occurs when they swing in planes at right angles or 90 degrees relative to each other. While it is convenient to combine the two right angle components to give a resultant indicative of angle and direction of the tool axis, it will be understood that the present invention is not limted to the illustrated right angle arrangement of the pendulum elements. In fact the pendulum can be mounted using an angular relationship therebetween. It will also be understood that while the two pendulum arrangement described is preferred for convenience, any other number of pendulum elements could also be employed.

As illustrated and described above, the pad system supporting the electrodes in the borehole uses three pads spaced at intervals of 120 degrees around the borehole circumference, mounted in a fixed relationship with two pendulum elements, only one of which swings through the plane of an electrode pad. For reasons of mechanical simplicity, this is the preferred arrangement, however, for other reasons, for example, simplification of mathematical computations in analyzing the dip information, it may be desirable to employ more than three pads and more than two pendulum elements in other than the above described arrangement and angular relationship. For example, four pads could be used spaced at 90 degree intervals around the borehole with two pendulum elements, one swinging in a N-S plane through diametrically opposite pads numbers one and three, and the other swinging at right angles to the first pendulum in an E-W plane through diametrically opposite pads two and four. The signals thus generated by the inclination of the borehole would be directly proportional to the vertical elevation of the coinciding pads. In a similar manner, six pads could be used with two or more, for instance, three pendulum elements.

While particular embodiments of the invention have been described and illustrated it will be recognized that many modifications will become readily apparent to those skilled in this art and it is, therefore, contemplated by the appended claims to cover all such modifications as fall within the true spirit and scope of the present invention.

What is claimed as new and desired to be secured by Letters Patent of the United States is:

1. In a method of logging a borehole to determine the dip of at least one stratum in the earth formations surrounding the borehole, the steps of obtaining measurements from at least three spaced apart points carried upon a logging tool and located in proximity to the walls of the borehole with each of the measurements obtained being characterized by variations corresponding to changes in the earth formations, moving said three points in unison longitudinally through the borehole and past said stratum, continuously recording the measurements obtained as said points are moved, orienting said points along predetermined azimuths, sensing any deviation of said points from said predetermined azimuths, and maintaining each of said points along its predetermined azimuth during the movement of the points to obtain the measurements by turning the logging tool in a direction to restore said points to their respective predetermined azimuths whenever they tend to deviate therefrom.

2. In a tool movable through a borehole, drive mechanism for turning said tool, apparatus for sensing change in azimuth of the tool from a predetermined azimuth and for developing electrical control signals in response to deviation of said tool from the predetermined azimuth beyond a preselected amount, and means controlled by said apparatus for rendering said drive mechanism ineffective to turn said tool when the latter is oriented along the predetermined azimuth and for supplying said electrical signals to said drive mechanism to render said mechanism effective in the event of deviation of the tool from the predetermined axis to turn said tool in the proper direction to restore the tool to the predetermined axis.

3. The apparatus defined by claim 2 wherein the sensing apparatus includes a gyro device for developing the electrical signals.

4. The apparatus defined by claim 2 wherein the sensing apparatus includes magnetically operated means co-operating with the earth's magnetic field to establish the predetermined azimuth and to sense the deviation of the tool from the predetermined azimuth.

5. Apparatus according to claim 4 wherein the magnetically operated means includes at least one fixed plate secured to the tool and a movable plate cooperating with the fixed plate to form a variable capacitor, said magnetically operated means including structure for aligning the movable plate with the predetermined azimuth established so that deviations of the tool from this azimuth cause corresponding variations in said capacitor, said magnetically operated means including a circuit responsive to the variations in said capacitor for controlling the means for rendering the drive mechanism effective and ineffective.

6. Apparatus according to claim 2 wherein the sensing apparatus includes at least one light source, at least one light sensitive device and magnetically operated structure for controlling the passage of light from the source to said light sensitive device, said magnetically operated structure cooperating with the earth's magnetic field and with the source and the light sensitive device to establish said predetermined azimuth and to render the light sensitive device effective to supply a control signal to the means for rendering the drive mechanism effective and ineffective whenever the tool deviates from the predetermined azimuth.

7. Apparatus according to claim 6 wherein the light source and the light sensitive device are mounted in fixed position upon the tool and the magnetically controlled structure includes a light controlling member carrying a magnet and mounted for rotation about the axis of the tool, said light controlling member being disposed between the light source and the light sensitive device.

8. Apparatus according to claim 7 wherein the light controlling member is supported at its center to tilt between the light source and the light sensitive device in response to changes in direction or inclination of the borehole.

9. Apparatus according to claim 7 wherein upper and lower support means are respectively provided above and below the light controlling member for supporting said member so that it cannot tilt between the light source and the light sensitive device in response to a change in direction or inclination of the borehole.

10. Apparatus according to claim 9 wherein the magnet is disposed below the lower support means and is connected to the light controlling member by means including a universal joint.

11. In a tool attached to a cable for raising and lowering the tool within a borehole, the combination of a first tool section secured to the cable for rotation therewith, a second tool section mounted for rotation with respect to the first section, a drive mechanism for turning said second tool section about the axis of the borehole, apparatus for sensing deviation of the second tool section from a predetermined azimuth and for developing electrical signals in response to change in azimuth beyond a predetermined amount, and means controlled by said apparatus for rendering said drive mechanism ineffective to turn said second tool section when the second tool section is oriented along the predetermined azimuth and for rendering said drive mechanism effective in response to electrical signals in the event of deviation of the second section from the predetermined azimuth to turn said second section in the proper direction to restore the second section to the predetermined azimuth.

12. The apparatus defined by claim 11 wherein the apparatus for sensing deviation of the second tool section from the predetermined azimuth includes a gyro device.

13. The apparatus defined by claim 11 wherein the apparatus for sensing deviation of the second tool section from the predetermined azimuth includes a magnet cooperating with the earth's magnetic field.

14. Apparatus according to claim 13 wherein the sensing apparatus includes a variable capacitor formed by a fixed plate secured to the second tool section and a movable plate mounted for rotation upon the second tool section, the rotation of the movable plate being controlled by said magnet.

15. The apparatus defined by claim 13 wherein the sensing apparatus includes a light sensitive device, a light source, and a member mounted for rotation upon the second tool section between the source and the device for controlling the passage of light to said device, the rotation of said member being controlled by said magnet.

16. Apparatus according to claim 15 wherein the light controlling member is supported at its center to tilt between the light source and the light sensitive device in response to changes in the direction or inclination of the borehole.

17. Apparatus according to claim 15 wherein upper and lower support means are respectively provided above and below said member for supporting said member so that it cannot tilt between the light source and the light sensitive device when the direction or inclination of the borehole changes.

18. Apparatus according to claim 17 wherein the magnet is disposed below the lower support means and is operatively connected to the light controlling member by means including a universal joint.

19. In a method of logging a borehole to determine the dip of at least one stratum in the earth formations surrounding the borehole, the steps of obtaining signals from at least three spaced apart points carried upon a logging tool and located in proximity to the walls of the borehole with each of the signals obtained being characterized by variations corresponding to changes in the earth formations, moving said three points in unison longitudinally through a predetermined zone in the borehole and past said stratum, continuously recording the signals obtained as said points are moved in order to produce a first set of curves each representing the signals obtained from one of said points, maintaining each of said points along substantially the same azimuth with respect to the axis of the borehole during the recording of the first set of curves, changing the effective orientation of said points by turning said logging tool while said logging tool remains within the borehole so that each point is disposed along a new and different azimuth with respect to the axis of the borehole, moving said points through the predetermined zone a second time, recording a second set of curves as the points are moved through the predetermined zone said second time, controlling the displacement between the azimuth of each point during the movement through said zone said second time and the azimuth of the same point during the production of the first set of curves to provide a predetermined fixed displacement in azimuth, and maintaining each of said points substantially along its new and different azimuth during the recording of the second set of curves.

20. In a well logging tool for determining the dip of at least one stratum in subsurface formations surrounding a borehole extending into the formation from the earth's surface, the combination of means including a logging tool adapted to be lowered into the borehole and carrying a plurality of spaced apart sensing elements in engagement with the walls of the borehole for developing a plurality of signals respectively representative of the effect of at least one characteristic of the formations upon the different sensing elements, means for repeatedly moving said sensing elements through a predetermined zone in the borehole, mechanism for maintaining each of the sensing elements substantially oriented in fixed azimuth during a first movement through said predetermined zone, means for separately recording the signals developed during the first movement in order to produce a first set of curves, and means controlled from the earth's surface for altering the orientation of the sensing elements at the completion of the first movement by turning said tool through a predetermined angle while maintaining said logging tool within the borehole so that a second set of curves is produced by the recording means in response to a second movement of the sensing elements through said predetermined zone, said mechanism being effective during said second movement substantially to maintain the azimuth of said sensing elements in their altered orientation.

21. In an apparatus for logging a borehole to determine the dip of at least one stratum in the earth formations surrounding the borehole, the combination of a downhole tool including a first tool section, a second tool section mounted for rotation upon the first section and containing at least three spaced apart sensing elements, means biasing said sensing elements into engagement with the walls of the borehole, means for moving said tool through the borehole so that said sensing elements pass along the walls of the borehole, means for developing from each sensing element characteristic signals representing at least one characteristic of the earth formations varying from stratum to stratum, caliper means in said second tool section responsive to the movement of at least one of said sensing elements resulting from changes in borehole diameter for developing caliper signals indicative of the variations in borehole diameter, an inclinometer apparatus on said second tool section for developing inclinometer signals indicative of the direction and inclination of the borehole, said sensing elements, said caliper means and said inclinometer apparatus being mounted in fixed, preoriented position upon the lower tool section, means for recording said caliper signals, said characteristic signals and said inclinometer signals, and means for maintaining said lower tool section oriented along substantially the same azimuth with respect to the axis of the borehole during the movement of the tool through the borehole.

22. In an apparatus for logging a borehole to determine the dip of at least one stratum in the earth formations surrounding the borehole, the combination of a downhole tool including a first tool section, a second tool section mounted for rotation upon the first section and containing at least three spaced apart sensing elements located in proximity to the walls of the borehole, means for moving said tool through the borehole, means for developing from each sensing element characteristic signals representing at least one characteristic of the earth formations varying from stratum to stratum, caliper means in said second tool section for developing caliper signals indicative of the variations in diameter of the borehole traversed by said tool, an inclinometer apparatus on said second tool section for developing inclinometer signals indicative of the direction and inclination of the borehole, said sensing elements, said caliper means and said inclinometer apparatus being mounted in fixed, preoriented position upon the lower tool section, means for recording said caliper signals, all of said characteristic signals and said inclinometer signals, and means for maintaining said lower tool section oriented along substantially the same azimuth with respect to the axis of the borehole during the movement of the tool through the borehole.

23. In a tool adapted to be lowered into a borehole, the combination of sensing apparatus for detecting a change in azimuth of the tool, said apparatus comprising means for establishing a predetermined azimuth of orientation of said tool, means for developing electrical control signals in response to rotation of said tool about the axis of the borehole to deviate from the predetermined azimuth, and means responsive to said control signals for rotating said tool to return it to the predetermined azimuth.

24. The apparatus defined by claim 11 wherein there is further provided means for indicating at the earth's surface deviation of said second tool section from said predetermined azimuth beyond a preselected amount.

25. In a method of exploring a pair of spaced apart areas at least one of which contains a borehole oriented with respect to a predetermined point in the other area along a line having a predetermined azimuth, the steps of lowering a logging tool containing a plurality of spaced apart sensing elements into the borehole, turning the tool within said borehole until the sensing elements bear a fixed predetermined orientation with respect to said predetermined azimuth, determining the dip of at least one stratum passing through said borehole and beneath said other area by making measurements from the sensing elements of the characteristics of earth formations adjacent said borehole, and maintaining said sensing elements in fixed azimuth orientation with respect to said predetermined azimuth while said measurements are being made so that the dip determination is indicative of the dip of said stratum beneath said predetermined point in said other area.

26. In a method of exploring a pair of spaced apart areas at least one of which contains a borehole oriented with respect to a predetermined point in the other area along a line having a predetermined azimuth, the steps of lowering a logging tool containing a plurality of spaced apart sensing elements into the borehole, turning the tool within said borehole until the sensing elements bear a fixed predetermined orientation with respect to said predetermined azimuth, determining the dip of at least one stratum passing through said borehole and beneath said area by making measurements of the characteristics of the earth formations adjacent said borehole, sensing any deviation of the sensing elements from their fixed orientation with respect to said predetermined azimuth, and correcting the positions of the sensing elements by turning said logging tool upon the occurrence of any deviation in order to maintain them oriented in substantially fixed position with respect to said predetermined azimuth so that the dip determination indicates the dip of said stratum beneath said predetermined point in said other area.

27. In a tool attached to a cable for raising and lowering the tool within a borehole, the combination comprising: an upper tool section secured to the cable for rotation therewith; a lower tool section; and means including a chamber containing liquid, a cylinder in communication with said chamber, said cylinder having an opening in communication with a borehole, and a piston disposed in said cylinder between said chamber and said borehole opening, whereby pressure between a borehole and said chamber may be equalized, for mounting said lower tool section for relatively low friction rotation with respect to said upper section so as to substantially isolate the lower tool section from turning of the cable and the upper tool section.

28. In a tool attached to a cable for raising and lowering the tool within a borehole the combination comprising: an upper tool section secured to the cable for rotation therewith; a lower tool section; and means for mounting said lower tool section for relatively low friction rotation with respect to said upper tool section so as to substantially isolate the lower tool section from turning of the cable and the upper tool section, the last named means comprising structure defining a fluid filled chamber within one of said tool sections, drive mechanism housed partially within said chamber and including a member extending out of said chamber for operative connection to the other tool section, and means for equalizing the pressure of the borehole fluid and the fluid within said chamber.

29. The combination defined by claim 28 wherein the chamber is formed within the upper tool section and wherein the drive mechanism mounted within the chamber is operatively connected to the lower tool section.

30. The method defined by claim 19 wherein the predetermined fixed displacement between the azimuth of each of the points during the production of the second set of curves and the abimuths of the same points during the production of the second set of curves is substantially 180°.

31. The apparatus defined by claim 20 wherein the means for altering the orientation of the sensing elements is constructed and arranged so that the azimuth of each sensing element during the second movement is displaced from the azimuth occupied by that element during the first movement by about 180°.

32. The structure defined by claim 23 wherein there is further provided means for indicating at the earth's surface deviation of said tool from said predetermined azimuth beyond a preselected amount.

33. The structure defined by claim 23 wherein the sensing apparatus includes a gyro device for developing the electrical signals.

34. The structure defined by claim 23 wherein the sensing apparatus includes magnetically operated means cooperating with the earth's magnetic field to establish the predetermined azimuth and to sense the deviation of the tool from the predetermined azimuth.

35. The structure defined by claim 34 wherein the magnetically operated means includes at least one fixed plate secured to the tool and a movable plate cooperating with the fixed plate to form a variable capacitor, said magnetically operated means including structure for aligning the movable plate with the predetermined azimuth established so that deviations of the tool from this azimuth cause corresponding variations in said capacitor, said magnetically operated means including a circuit responsive to the variations in said capacitor for controlling the means for rendering the drive mechanism effective and ineffective.

36. The structure defined by claim 23 wherein the sensing apparatus includes at least one light source, at least one light sensitive device and magnetically operated structure for controlling the passage of light from the source to said light sensitive device, said magnetically operated structure cooperating with the earth's magnetic field and with the source and the light sensitive device to establish said predetermined azimuth and to render the light sensitive device effective to supply a control signal to the means for rendering the drive mechanism effective and ineffective whenever the tool deviates from the predetermined azimuth.

37. The structure defined by claim 36 wherein the light source and the light sensitive device are mounted in fixed position upon the tool and the magnetically controlled structure includes a light controlling member carrying a magnet and mounted for rotation about the axis of the tool, said light controlling member being disposed between the light source and the light sensitive device.

38. The structure defined by claim 37 wherein the light controlling member is supported at its center to tilt between the light source and the light sensitive device in response to changes in direction or inclination of the borehole.

39. The structure defined by claim 37 wherein upper and lower support means are respectively provided above and below the light controlling member for supporting said member so that it cannot tilt between the light source and the light sensitive device in response to a change in direction or inclination of the borehole.

40. The structure defined by claim 39 wherein the magnet is disposed below the lower support means and is connected to the light controlling member by means including a universal joint.

41. In a method of logging a borehole to determine at least one characteristic of earth formations surrounding the borehole, the steps of obtaining signals from at least one sensing point carried upon a logging tool adapted to be raised and lowered within the borehole with the signal obtained being characterized by variations corresponding to changes in the earth formations, moving said point longitudinally through a predetermined zone in the borehole, continuously recording the signals obtained as said point is moved in order to produce a first curve representing the signals obtained, maintaining said point along substantially the same azimuth with respect to the axis of the borehole during the recording of the first curve, changing the effective orientation of said point by turning said logging tool through a predetermined angle while said logging tool remains within the borehole so that the point is disposed along a new and different azimuth with respect to the axis of the borehole, moving said point through the predetermined zone a second time, obtaining a second set of signals as the point is moved through the predetermined zone said second time, and maintaining said point substantially along its new and different azimuth during the movement through said zone said second time.

42. The method defined by claim 41 wherein the logging tool is turned through an angle of about 180° to provide the displacement between the azimuths occupied by the sensing point during the two movements through the predetermined zone.

43. In a well logging tool for determining at least one characteristic of subsurface earth formations surrounding a borehole extending into the formations from the earth's surface, the combination of means including a logging tool adapted to be lowered into the borehole and carrying at least one sensing element for developing signals representative of the effect of said characteristic of the formations upon the sensing element, means for repeatedly moving said sensing element through a predetermined zone in the borehole, mechanism for maintaining said sensing element substantially oriented in fixed azimuth during a first movement through said predetermined zone, means for recording the signals developed during the first movement in order to produce a first curve, and means controlled from the earth's surface for turning said logging tool within the borehole through a predetermined angle in order to alter the orientation of the sensing element at the completion of the first movement, a second set of signals being developed by the sensing element when the logging tool is moved through said predetermined zone a second time, said mechanism being effective during said second movement substantially to maintain the azimuth of said sensing element in its altered orientation.

44. The apparatus defined by claim 43 wherein the means for turning the logging tool is effective to turn the tool about 180° at the completion of the first movement of the tool through the predetermined zone.

45. In an apparatus for logging a borehole to determine the dip of at least one stratum in the earth formations surrounding the borehole, the combination of a downhole tool, means including a cable adapted to be raised and lowered within the borehole for moving said tool through the borehole, said downhole tool including a first tool section mounted upon said cable for rotation therewith and a second tool section mounted for rotation upon the first section and containing at least three spaced apart sensing elements located in proximity to the walls of the borehole, means for developing from each sensing element characteristic signals representing at least one characteristic of the earth formations varying from stratum to stratum, means for recording said characteristic signals, and means for maintaining said lower tool section oriented along substantially the same azimuth with respect to the axis of the borehole during the movement of the tool through the borehole, the last named means including means in the lower tool section for sensing deviation of said lower tool section from said azimuth and developing signals in response to such deviation, and drive mechanism operatively connecting the two tool sections and supplied with the signals from said sensing means for turning said lower tool section in a direction to restore said tool section to said azimuth in response to any deviation therefrom.

46. The apparatus defined by claim 45 wherein the lower tool section is provided with caliper means for developing caliper signals indicative of the variations in diameter of the borehole traversed by said tool, with an inclinometer apparatus for developing inclinometer signals indicative of the direction and inclination of the borehole, said sensing elements, said caliper means and said inclinometer apparatus being mounted in fixed, preoriented position upon the lower tool section and wherein the recording means is effective to record said caliper signals and said inclinometer signals along with said characteristic signals.

47. In an apparatus for logging a borehole to determine at least one characteristic of the earth formations surrounding the borehole, the combination of a downhole tool, means including a cable having a number of conductors attached to said tool for raising and lowering the tool within the borehole, said tool including a first tool section secured to said cable for rotation therewith and a second tool section mounted for rotation upon the first section and containing at least one sensing element, means for developing from said sensing element characteristic signals representing said characteristic of the earth formations when said tool is moved through a predetermined zone in the borehole, means at the earth's surface for recording said characteristic signals, means for maintaining said lower tool section oriented along substantially the same azimuth with respect to the axis of the borehole during the movement of the tool through the borehole, the last named means including means for sensing any deviation of said lower tool section from said azimuth and for developing electrical signals in response thereto, a drive mechanism including an electric motor for operatively connecting the two tool sections, said drive mechanism being supplied with the signals from the sensing means in order to turn said lower tool section in a direction to restore the lower tool section to said azimuth if it tends to deviate therefrom, switching means in said downhole tool for connecting said sensing means to said drive mechanism and effective, when operated, to cause the drive mechanism to turn said lower tool section through a predetermined angle and to cause the means for maintaining the orientation of the lower tool section to orient said lower tool section along a different azimuth, and selectively operated means for supplying a control signal from the surface via at least one of the conductors of said cable in order to operate said switching means.

48. In an apparatus for logging a borehole to determine the dip of at least one stratum in the earth formations surrounding the borehole, the combination of a downhole tool, means including a cable having a number of conductors and attached to said tool for raising and lowering the tool within the borehole, said tool including a first tool section secured to said cable for rotation therewith and a second tool section mounted for rotation upon the first section and containing at least three spaced apart measuring electrodes and three spaced apart current electrodes, means for biasing said electrodes against the earth formations adjacent the borehole, means for developing from each measuring electrode signals representing the resistivity of the earth formations adjacent that electrode when said tool is moved through a predetermined zone in the borehole, means for supplying A.C. current from the surface via a first of the cable conductors to said current electrodes, caliper means in said second tool section responsive to the movement of at least one of said electrodes resulting from changes in borehole diameter for developing caliper signals indicative of variations in borehole diameter, an inclinometer apparatus on said second tool section for developing inclinometer signals indicative of the direction and amount of inclination of the borehole, all six of said electrodes, said caliper means, and said inclinometer apparatus being mounted in fixed, preoriented position upon the lower tool section, means at the earth's surface for recording said caliper signals, said characteristic signals and said inclinometer signals, means including said first conductor for connecting the recording means to said caliper means, means including a second and third of said conductors connecting the inclinometer apparatus to the recording means, said three measuring electrodes being respectively connected to the recording means through fourth, fifth and sixth of said conductors, means for maintaining said lower tool section oriented along substantially the same azimuth with respect to the axis of the borehole during the movement of the tool through the borehole, the last named means including means for sensing any deviation of said lower tool section from said azimuth and for developing electrical signals in response thereto and a drive mechanism including an electric motor for operatively connecting the two tool sections, said drive mechanism being supplied wtih the signals from the sensing means in order to turn said lower tool section in a direction to restore the lower tool section to said azimuth if it tends to deviate therefrom, means for supplying power to said motor from the means supplying A.C. current to said current electrodes, switching means in said downhole tool for connecting said sensing means to said drive mechanism and effective when operated to render the drive mechanism operative to turn said lower tool section through a predetermined angle and to cause the means for maintaining the orientation of the lower tool section to orient said lower tool section along a different azimuth, and selectively operable means for supplying a D.C. signal from the surface via said first conductor to operate said switching means.

49. In an apparatus for logging a borehole to determine the dip of at least one stratum in the earth formations surrounding the borehole, the combination of a downhole tool, means including a cable having a number of conductors and attached to said tool for raising and lowering the tool within the borehole, said tool including a first tool section secured to said cable for rotation therewith and a second tool section mounted for rotation upon the first section and containing at least three spaced apart sensing elements, means for developing from each sensing element characteristic signals representing at least one characteristic of the earth formations when said tool is moved through a predetermined zone in the borehole, caliper means in said second tool section responsive to the movement of at least one of said sensing elements resulting from changes in borehole diameter for developing caliper signals indicative of the variations in borehole diameter, an inclinometer apparatus on said second tool section for developing inclinometer signals indicative of the direction and amount of inclination of the borehole, said sensing elements, said caliper means, and said inclinometer apparatus being mounted in fixed, preoriented position upon the lower tool section, means at the earth's surface for recording said caliper signals, said characteristic signals and said inclinometer signals, means including a first of the conductors of the cable connecting the recording means to said caliper means, means including a second and third of said conductors connecting the inclinometer apparatus to the recording means, said three sensing elements being respectively connected to the recording means through fourth, fifth and sixth of said conductors, means for maintaining said lower tool section oriented along substantially the same azimuth with respect to the axis of the borehole during the movement of the tool through the borehole, the last named means including means for sensing any deviation of said lower tool section from said azimuth and for developing electrical signals in response thereto and a drive mechanism including an electric motor for operatively connecting the two tool sections, said drive mechanism being supplied with the signals from the sensing means in order to turn said lower tool section in a direction to restore the lower tool section to said azimuth if it tends to deviate therefrom, means including said first conductor for supplying A.C. power to said motor from the surface, switching means in said downhole tool for connecting said sensing means to said drive mechanism and effective when operated to render the drive mechanism operative to turn said lower tool section through a predetermined angle and to cause the means for maintaining the orientation of the lower tool section to orient said lower tool section along a different azimuth, and means for supplying a D.C. signal from the surface via said first conductor to operate said switching means.

50. In an apparatus for logging a borehole to determine the dip of at least one stratum in the earth formations surrounding the borehole, the combination of a downhole tool, means including a cable having a number of conductors and attached to said tool for raising and lowering the tool within the borehole, said tool including a first tool section secured to said cable for rotation therewith and a second tool section mounted for rotation upon the first section and containing at least three spaced apart electrodes, means for biasing said electrodes against the earth formations adjacent the borehole, means for developing from each measuring electrode characteristic signals representing the resistivity of the earth formations adjacent that electrode when said tool is moved through a predetermined zone in the borehole, means for supplying A.C. current from the surface via a first of the cable conductors to said current electrodes, an inclinometer apparatus on said second tool section for developing inclinometer signals indicative of the direction and amount of inclination of the borehole, all six of said electrodes and said inclinometer apparatus being mounted in fixed, preoriented position upon the lower tool section, means at the earth's surface for recording said characteristic signals and said inclinometer signals, means including a second and third of said conductors for connecting the inclinometer apparatus to the recording means, said three measuring electrodes being respectively connected to the recording means through fourth, fifth and sixth of said conductors, means for maintaining said lower tool section oriented along substantially the same azimuth with respect to the axis of the borehole during the movement of the tool through the borehole, the last named means including means for sensing any deviation of said lower tool section from said azimuth and for developing electrical signals in response thereto and a drive mechanism including an electric motor for operatively connecting the two tool sections, said drive mechanism being supplied with the signals from the sensing means in order to turn said lower tool section in a direction to restore the lower tool section to said azimuth if it tends to deviate therefrom, and means including said first conductor for supplying power to said motor from the surface.

51. In an apparatus for logging a borehole to determine the dip of at least one stratum in the earth formations surrounding the borehole, the combination of a downhole tool, means including a cable having a number of conductors and attached to said tool for raising and lowering the tool within the borehole, said tool including a first tool section secured to said cable for rotation therewith and a second tool section mounted for rotation upon the first section and containing at least three spaced apart sensing elements, means for developing from each sensing element characteristic signals representing at least one characteristic of the earth formations when said tool is moved through a predetermined zone in the borehole, an inclinometer apparatus on said second tool section for developing inclinometer signals indicative of the direction and amount of inclination of the borehole, said sensing elements and said inclinometer apparatus being mounted in fixed, preoriented position upon the lower tool section, means at the earth's surface for recording said characteristic signals and said inclinometer signals, means including a first and second of said conductors for connecting the inclinometer apparatus to the recording means, the three sensing elements being respectively connected to the recording means through third, fourth and fifth of said conductors, means for maintaining said lower tool section oriented along substantially the same azimuth with respect to the axis of the borehole during the movement of the tool through the borehole, the last named means including means for sensing any deviation of said lower tool section from said azimuth and for developing electrical signals in response thereto and a drive mechanism including an electric motor for operatively connecting the two tool sections, said drive mechanism being supplied with the signals from the sensing means in order to turn said lower tool section in a direction to restore the lower tool section to said azimuth if it tends to deviate therefrom.

References Cited in the file of this patent

UNITED STATES PATENTS

| Number | Name | Date |
| --- | --- | --- |
| 1,209,102 | Anschutz-Kaempfe | Dec. 19, 1916 |
| 1,868,833 | Hester | July 26, 1932 |
| 1,928,969 | Kuffel | Oct. 3, 1933 |
| 2,176,169 | Doll | Oct. 17, 1939 |
| 2,332,777 | Boucher | Oct. 26, 1943 |
| 2,364,159 | Muffly | Dec. 5, 1944 |
| 2,427,950 | Doll | Sept. 23, 1947 |
| 2,524,360 | Russell | Oct. 3, 1950 |
| 2,674,049 | James | Apr. 6, 1954 |
| 2,777,070 | Stamper et al. | Jan. 8, 1957 |
| 2,823,349 | French | Feb. 11, 1958 |